(12) United States Patent
Kalb et al.

(10) Patent No.: US 9,981,391 B2
(45) Date of Patent: May 29, 2018

(54) QUICK DISCONNECT APPARATUS FOR MODULAR TOOLING

(71) Applicant: Norgren Automation Solutions, LLC, Saline, MI (US)

(72) Inventors: James R. Kalb, Petersburg, MI (US); Michael Thomas Charlton, Clinton, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 0 days. days.

(21) Appl. No.: 15/583,527

(22) Filed: May 1, 2017

(65) Prior Publication Data

US 2017/0232620 A1   Aug. 17, 2017

Related U.S. Application Data

(63) Continuation-in-part of application No. 15/044,178, filed on Feb. 16, 2016.

(60) Provisional application No. 62/116,633, filed on Feb. 16, 2015.

(51) Int. Cl.
  *B23B 31/107* (2006.01)
  *B25J 15/04* (2006.01)
  *B25J 17/02* (2006.01)

(52) U.S. Cl.
  CPC .......... *B25J 17/02* (2013.01); *B23B 31/1071* (2013.01); *B25J 15/0416* (2013.01); *Y10T 279/1041* (2015.01)

(58) Field of Classification Search
  CPC ... B23B 31/1071; B23B 31/22; B23B 31/404; B25J 15/0416; B25J 17/02; Y10T 279/1037; Y10T 279/1041
  See application file for complete search history.

(56) References Cited

U.S. PATENT DOCUMENTS

| | | |
|---|---|---|
| 4,135,418 A | 1/1979 | McCray et al. |
| 4,350,463 A | 9/1982 | Friedline |
| 4,655,655 A | 4/1987 | Schurfeld |
| 4,767,246 A | 8/1988 | Camloh et al. |

(Continued)

FOREIGN PATENT DOCUMENTS

| | | |
|---|---|---|
| WO | 2014045390 A1 | 3/2014 |
| WO | 2014156508 A1 | 10/2014 |

OTHER PUBLICATIONS

Invitation to Pay Additional Fees, and, Where Applicable, Protest Fee dated Jun. 28, 2016, pp. 3-4, International Patent Application No. PCT/US2016/018025.

*Primary Examiner* — Eric A Gates
(74) *Attorney, Agent, or Firm* — Young Basile Hanlon & MacFarlane, P.C.

(57) ABSTRACT

A modular tooling receiver includes a housing having a wall and a port, and an engaging member movably disposed in the port. A lock actuator is moveable between a first position and a second position. The release lever is connected to the housing and is engageable with the lock actuator for causing movement of the lock actuator from the first position toward the second position. An anti-release mechanism is connected to the release lever and is movable between an engaged position, in which the anti-release mechanism engages the housing to restrain movement of the release lever to prevent movement of the lock actuator from the first position to the second position, and a disengaged position, in which the anti-release mechanism disengages the housing to allow movement of the release lever.

20 Claims, 22 Drawing Sheets

(56) References Cited

U.S. PATENT DOCUMENTS

| | | |
|---|---|---|
| 4,793,053 A | 12/1988 | Zuccaro et al. |
| 4,824,298 A | 4/1989 | Lippacher et al. |
| 4,836,068 A | 6/1989 | Erickson |
| 4,863,323 A | 9/1989 | Glaser |
| 4,919,023 A | 4/1990 | Bloink |
| 5,211,501 A | 5/1993 | Nakamura et al. |
| D363,979 S | 11/1995 | Clark |
| 6,000,306 A | 12/1999 | Erickson |
| 6,398,279 B1 | 6/2002 | Kikut |
| 6,439,860 B1 | 8/2002 | Greer |
| 6,932,358 B1 | 8/2005 | Geisman et al. |
| 7,252,453 B1 | 8/2007 | Little |
| 7,621,200 B2 | 11/2009 | Ichikawa |
| 7,779,716 B2 | 8/2010 | Dellach et al. |
| 8,005,570 B2 | 8/2011 | Gloden et al. |
| D647,181 S | 10/2011 | Kovach |
| D737,133 S | 8/2015 | Sandman et al. |
| D739,921 S | 9/2015 | Crochet, Sr. et al. |
| D756,492 S | 5/2016 | Crochet, Sr. et al. |
| 2009/0283656 A1 | 11/2009 | Greer |
| 2016/0153589 A1 | 6/2016 | Schwinning et al. |
| 2016/0236357 A1 | 8/2016 | Kalb et al. |

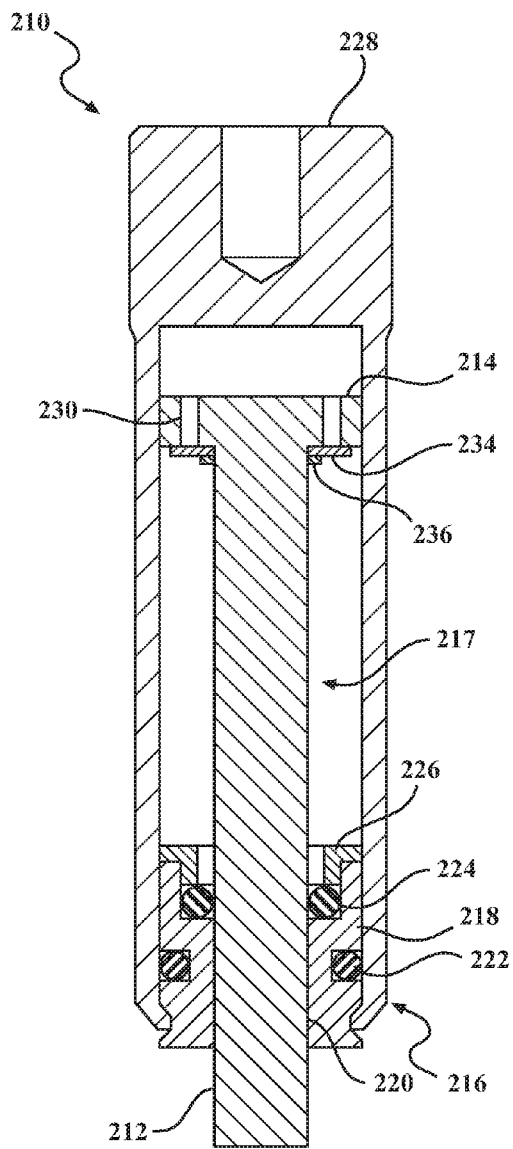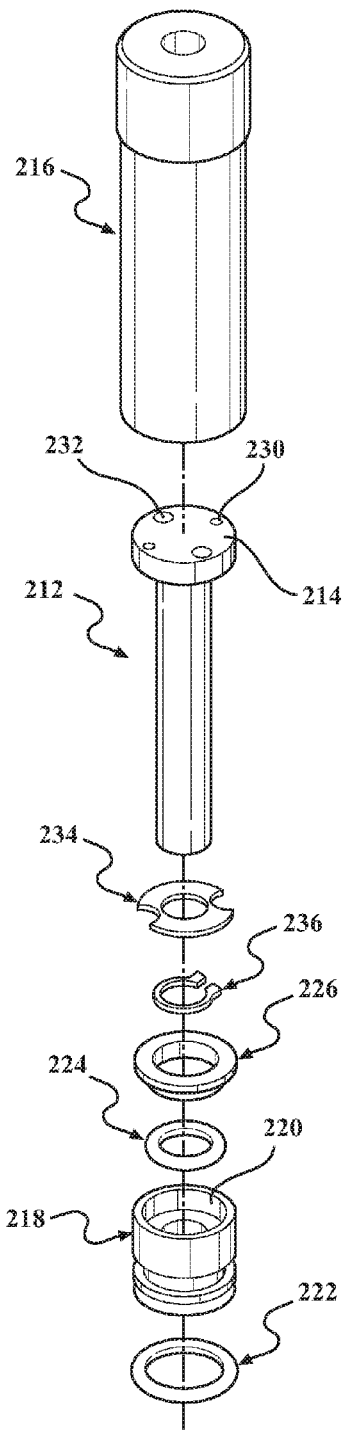
FIG. 13
FIG. 14

QUICK DISCONNECT APPARATUS FOR MODULAR TOOLING

CROSS-REFERENCE TO RELATED APPLICATIONS

This application is a continuation-in-part of U.S. nonprovisional application Ser. No. 15/044,178, which was filed on Feb. 16, 2016, which claims the benefit of U.S. provisional application No. 62/116,633, which was filed on Feb. 16, 2015.

BACKGROUND

Industrial manufacturing operations are often performed using automated manufacturing equipment, such as mechanical manipulators and robotic arms. The manufacturing equipment is often fitted with tooling that is intended to perform a specific function. The tooling may be specifically configured to a particular part, such that certain work holding devices, such as clamps, grippers, vacuum cups, etc. may engage and move the workpiece. The tooling is typically designed based on the geometry of the part with which it is intended to be used, and tooling that is designed for use with a particular part usually cannot be used with a different part.

Removable and replaceable tooling allows manufacturing equipment to be used to manufacture parts with various configurations as opposed to being dedicated to one particular part configuration. However, the time and effort needed to reconfigure manufacturing equipment from one purpose to another must be minimized to the greatest extent possible without comprising the accuracy and precision of the manufacturing equipment. In some designs, tooling is connected to the manufacturing equipment by conventional fasteners. Other designs provide quick disconnect tooling that allows the tooling to be replaced using a two-part coupler that can be quickly connected and disconnected. These two-part couplers often include structures that align and lock to the two coupler parts with respect to each other without the need for special tools or alignment procedures. Many quick disconnect coupler designs are, however, costly or difficult to operate. Therefore, need remains for quick disconnect couplers that are inexpensive and simple to operate.

SUMMARY

One aspect of the disclosure is a modular tooling receiver that includes a housing, an engaging member, a lock actuator, a release lever, and an anti-release mechanism. The housing includes a wall having a port that extends through it. The engaging member is movably disposed in the port. The lock actuator is disposed on a first side of the wall. The lock actuator is moveable between a first position in which the lock actuator urges the engaging member in a first direction defined from the first side of the wall to a second side of the wall and a second position wherein the lock actuator permits the engaging member to move in a second direction defined from the second side of the wall to the first side of the wall. The release lever is connected to the housing and is engageable with the lock actuator for causing movement of the lock actuator from the first position toward the second position. An anti-release mechanism is connected to the release lever and is movable between an engaged position, in which the anti-release mechanism engages the housing to restrain movement of the release lever to prevent movement of the lock actuator from the first position to the second position, and a disengaged position, in which the anti-release mechanism disengages the housing to allow movement of the release lever.

In some implementations, the housing includes a pocket, and the anti-release mechanism engages a surface inside the pocket in the engaged position. The housing may include a slot that is adjacent to the pocket, wherein the release lever is disposed in the slot. In some implementations, the pocket is wider than the anti-release mechanism and the anti-release mechanism is wider than the slot. The anti-release mechanism may be slidably connected to the release lever.

In some implementations, the modular tooling receiver includes a first biasing element that biases the lock actuator toward the first position. In some implementations, the modular tooling receiver includes a retainer that is positioned on the second side of the wall and is moveable between a first position in which the retainer is in engagement with the engaging member to obstruct movement of the engaging member in the second direction and a second position in which the retainer permits movement of the engaging member in the second direction. In some implementations, the modular tooling receiver includes a second biasing element that biases the retainer toward the first position of the retainer. The wall may be cylindrical. The retainer may be a ring. The lock actuator may be a piston. The engaging member may be spherical.

In some implementations, the modular tooling receiver includes a damper that controls a rate of motion of the lock actuator from the second position toward the first position. The damper may be an o-ring.

In some implementations, the engaging members are operable to retain engagement with a coupler in the first position and release the coupler in the second position.

Another aspect of the disclosed embodiments is a modular tooling assembly. The modular tooling assembly includes a coupler and a receiver. The receiver includes a housing, an engaging member, a lock actuator, a release lever, and a hold-open mechanism. The housing has a wall having a port that extends through it. The engaging member is movably disposed in the port for engagement with the coupler. The lock actuator is disposed on a first side of the wall. The lock actuator is moveable between a first position in which the lock actuator urges the engaging member toward the coupler in a first direction defined from the first side of the wall to a second side of the wall and a second position wherein the lock actuator permits the engaging member to move away from the coupler in a second direction defined from the second side of the wall to the first side of the wall. The release lever is connected to the housing and is engageable with the lock actuator for causing movement of the lock actuator from the first position toward the second position by movement of the lever from a lock position to a release position. The hold-open mechanism that is operable to retain the release lever in the release position while the coupler is in engagement with the housing and to allow the release lever to return the lock position when the coupler is no longer in engagement with the housing.

In some implementations, the release lever includes a recess and the hold-open mechanism includes a holding pin that engages the recess to retain the release lever in the release position. In some implementations, the hold-open mechanism includes a sensor pin that is engageable with the coupler. In some implementations, the hold-open mechanism prevents retraction of the holding pin from the recess of the release lever while the sensor pin is in engagement with the coupler, and permits retraction of the holding pin from the recess of the release lever when the sensor pin is no longer in engagement with the coupler. The holding pin may be biased toward the release lever such that it moves toward the release lever and into the recess when the release lever moves from the lock position to the release position.

Another aspect of the disclosed embodiments is a modular tooling assembly that includes a receiver and a coupler. The receiver has a housing including a wall having a port that extends through it, an engaging member that is movably disposed in the port, a lock actuator, and a release lever. The lock actuator is disposed on a first side of the wall. The lock actuator is moveable between a first position in which the lock actuator urges the engaging member in a first direction defined from the first side of the wall to a second side of the wall and a second position wherein the lock actuator permits the engaging member to move in a second direction defined from the second side of the wall to the first side of the wall. The release lever is connected to the housing and is engageable with the lock actuator for causing movement of the lock actuator from the first position toward the second position. The receiver also includes a first support part. The coupler includes a second support part. The first support part and the second support part are configured to allow the coupler to hang from the receiver while the coupler is moved from a disconnected position relative to the receiver to a connected position relative to the receiver.

BRIEF DESCRIPTION OF THE DRAWINGS

The various other uses of the present invention will become more apparent by referring to the following detailed description and drawings in which:

FIG. 13 is a cross-section view of a damper of the quick disconnect apparatus of FIG. 1.

FIG. 14 is an exploded view of the damper.

DETAILED DESCRIPTION

Figure 1:
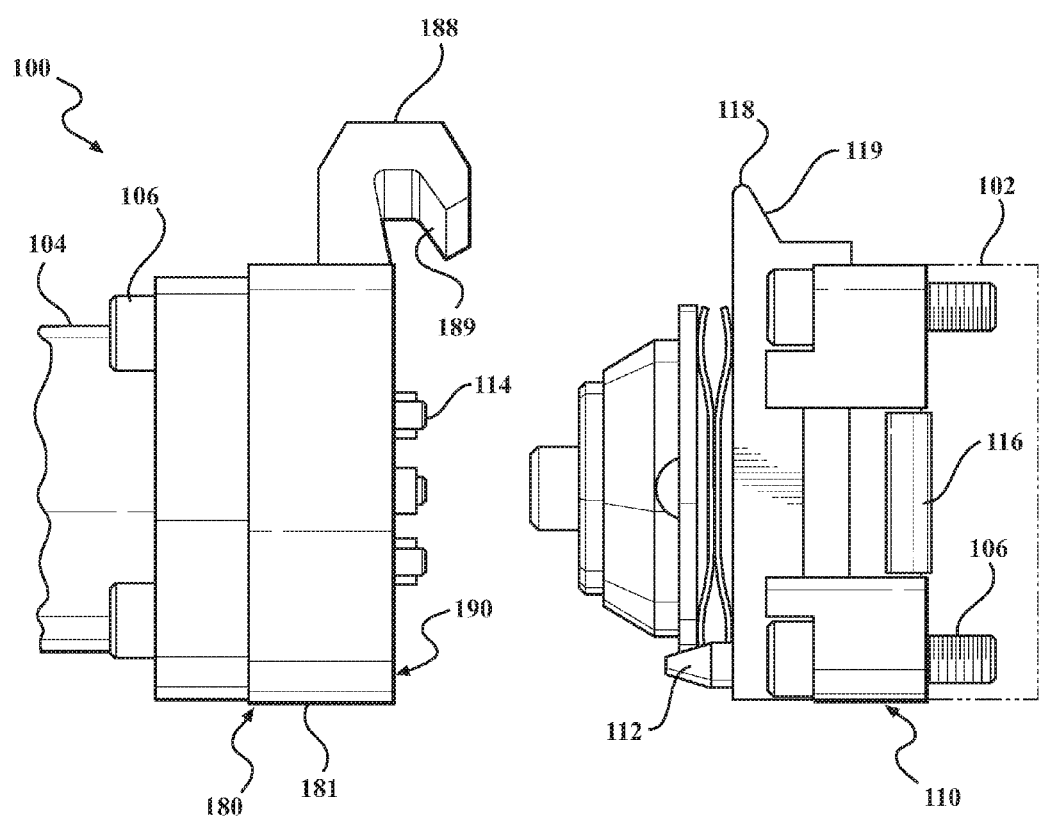
FIG. 1 is a side view showing a quick disconnect apparatus according to a first embodiment in a disconnected position.
Figure 2:
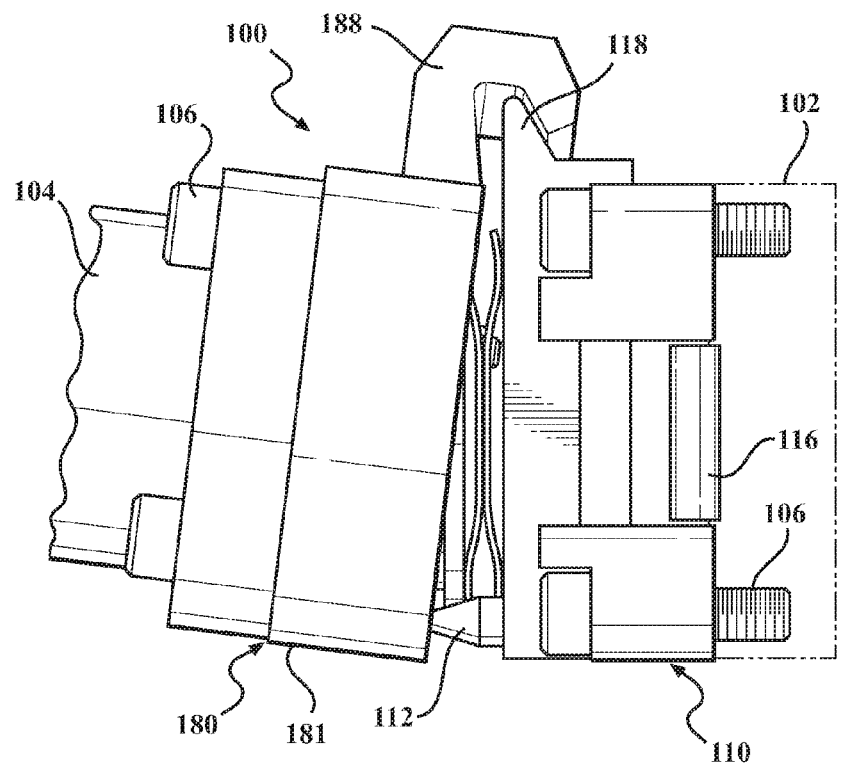
FIG. 2 is a side view showing the quick disconnect apparatus of FIG. 1 in a partially connected position.
Figure 3:
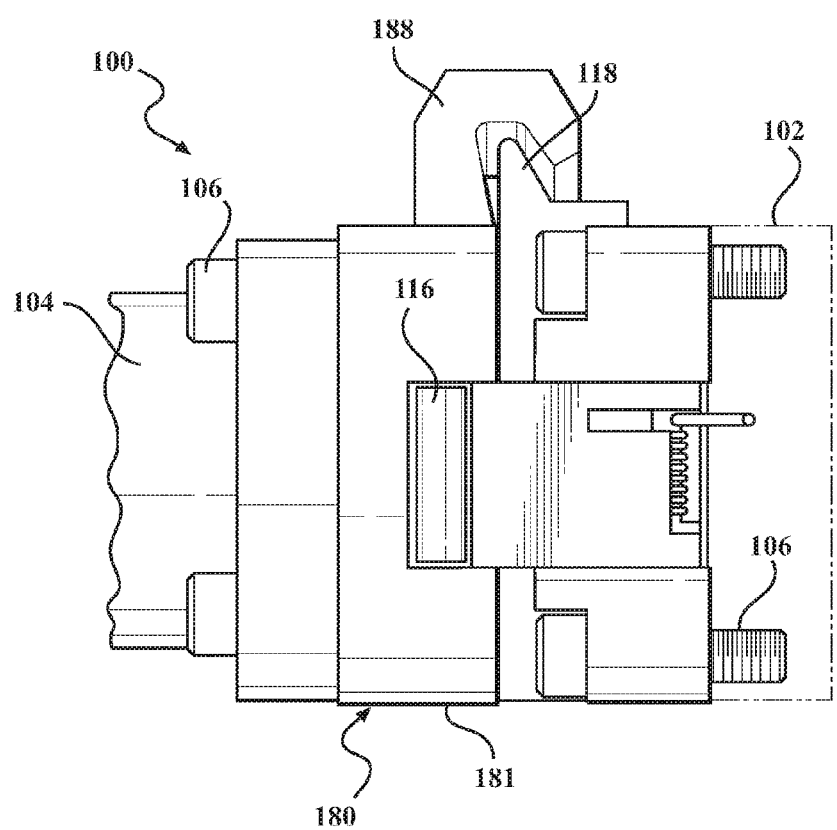
FIG. 3 is a side view showing the quick disconnect apparatus of FIG. 1 in a connected position.

FIGS. 1-3 show a quick disconnect apparatus 100 that includes a receiver 110 and a coupler 180 that is removably connectable to the receiver 110. In particular, the receiver 110 and the coupler 180 are moveable between a disconnected position (FIG. 1), wherein the receiver 110 and the coupler 180 are not in engagement with one another, a partially connected position (FIG. 2), wherein the receiver 110 is partially engaged with the coupler 180 but not locked to the coupler 180, and a connected position (FIG. 3), wherein the receiver 110 and the coupler 180 are in engagement with one another and are locked in a fixed relationship with respect to one another. The quick disconnect apparatus 100 may be part of a modular tooling assembly. The receiver 110 may also be referred to as a modular tooling receiver. The coupler 180 may also be referred to as a modular tooling adapter.

The quick disconnect apparatus 100 can be used to connect a base structure 102 to a tooling assembly 104. The base structure 102 can be any structure to which an additional structure, such as the tooling assembly 104, is desired to be attached. As one example, the base structure 102 can be automated manufacturing equipment, such as a mechanical manipulator or a robotic arm. The tooling assembly 104 can be any type of tooling as needed to perform a particular function and can include modular tooling, such as rods, joints, connectors, couplers, fingers, and/or shovels. The base structure 102 and the tooling assembly 104 can be connected to the receiver 110 and the coupler 180, respectively, using conventional elements such as fasteners 106.

In order to support the coupler 180 with respect to the receiver 110 while the coupler 180 is being connected to the receiver 110, the coupler 180 includes an elongate hook 188 and the receiver 110 includes an elongate flange 118. In the partially connected position, the coupler 180 is moved into engagement with the receiver 110 by placing the elongate hook 188 over the elongate flange 118 such that a rear facing angled interior surface 189 of the elongate hook 188 is engaged with a rear facing angled surface 119 of the elongate flange 118. When the rear facing angled interior surface 189 is engaged with and angularly aligned with (e.g. substantially coplanar with) the rear facing angled surface 119, the coupler 180 is angled with respect to the receiver 110, but can then be moved to the connected position by rotating the coupler 180 toward alignment with the receiver 110, with this rotation being centered on the point at which the elongate hook 188 contacts the elongate flange 118.

In order to align the connection between the receiver 110 and the coupler 180, one or more guide structures can be provided, such as a tapered guide pin 112. In the illustrated example, the tapered guide pin 112 is located on the receiver 110 and is received in a corresponding aperture in the coupler 180 when the receiver 110 and the coupler 180 are moved to the connected position. Also, to ensure that the coupler 180 is the appropriate one for connection to the receiver 110, mechanical code pins 114 can be provided on each of the receiver 110 and the coupler 180.

Figure 4:
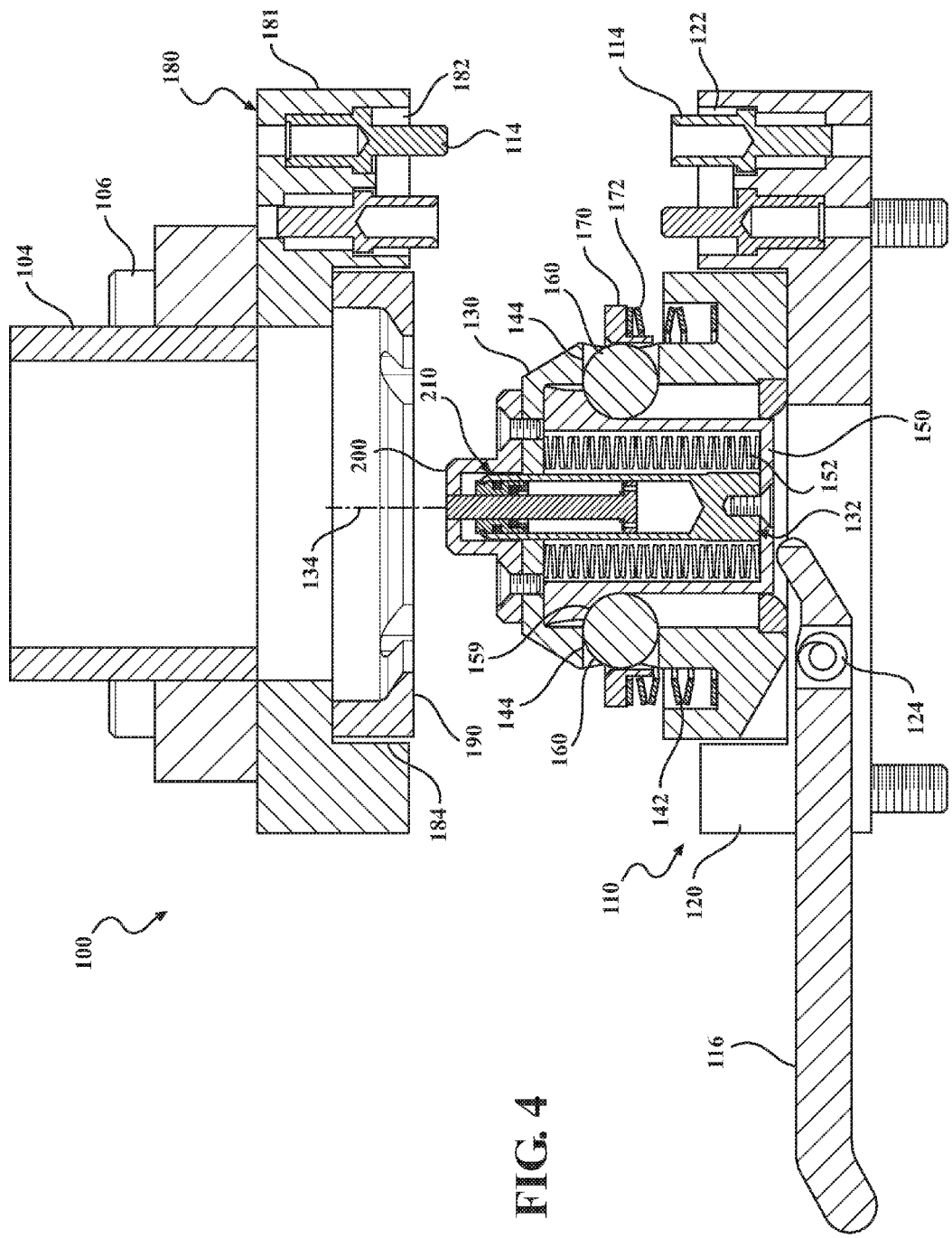
FIG. 4 is a cross-section view showing the quick disconnect apparatus of FIG. 1 in a disconnected position.

When the receiver 110 and the coupler 180 are in the disconnected position, they can be moved to the connected position by moving the receiver 110 and the coupler 180 toward one another. When the receiver 110 and the coupler 180 are in the connected position, they can be moved to the disconnected position by first operating a release lever 116 that can be pivoted from a lock position (FIG. 5) to a release position (FIGS. 4 and 6). When the release lever 116 reaches the release position, the lock previously established between the receiver 110 and the coupler 180 ceases, thus allowing the receiver 110 and the coupler 180 to be moved away from one another, as will be explained in detail herein.

Figure 5:
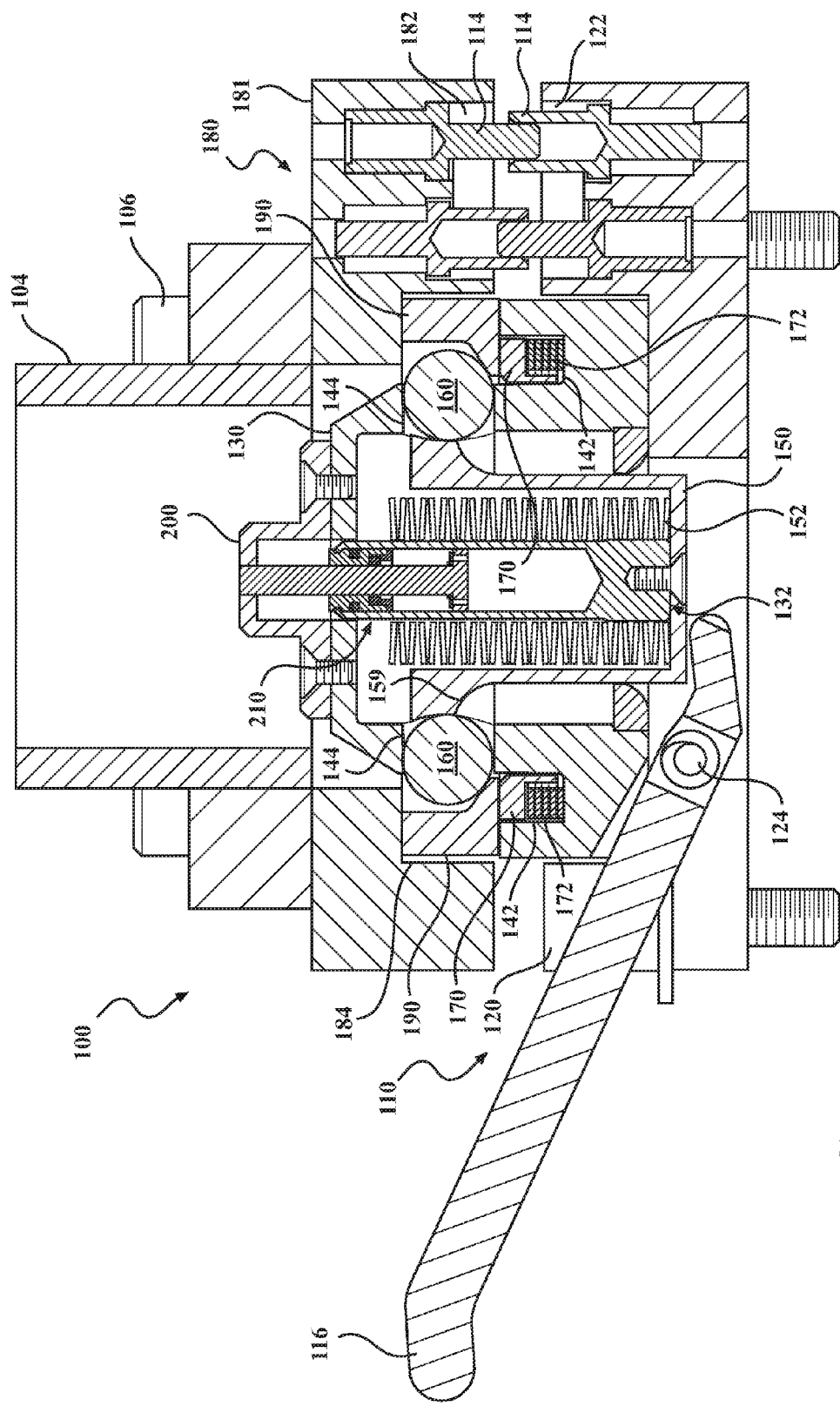
FIG. 5 is a cross-section view showing the quick disconnect apparatus of FIG. 1 in a connected position with a release lever in a lock position.
Figure 6:
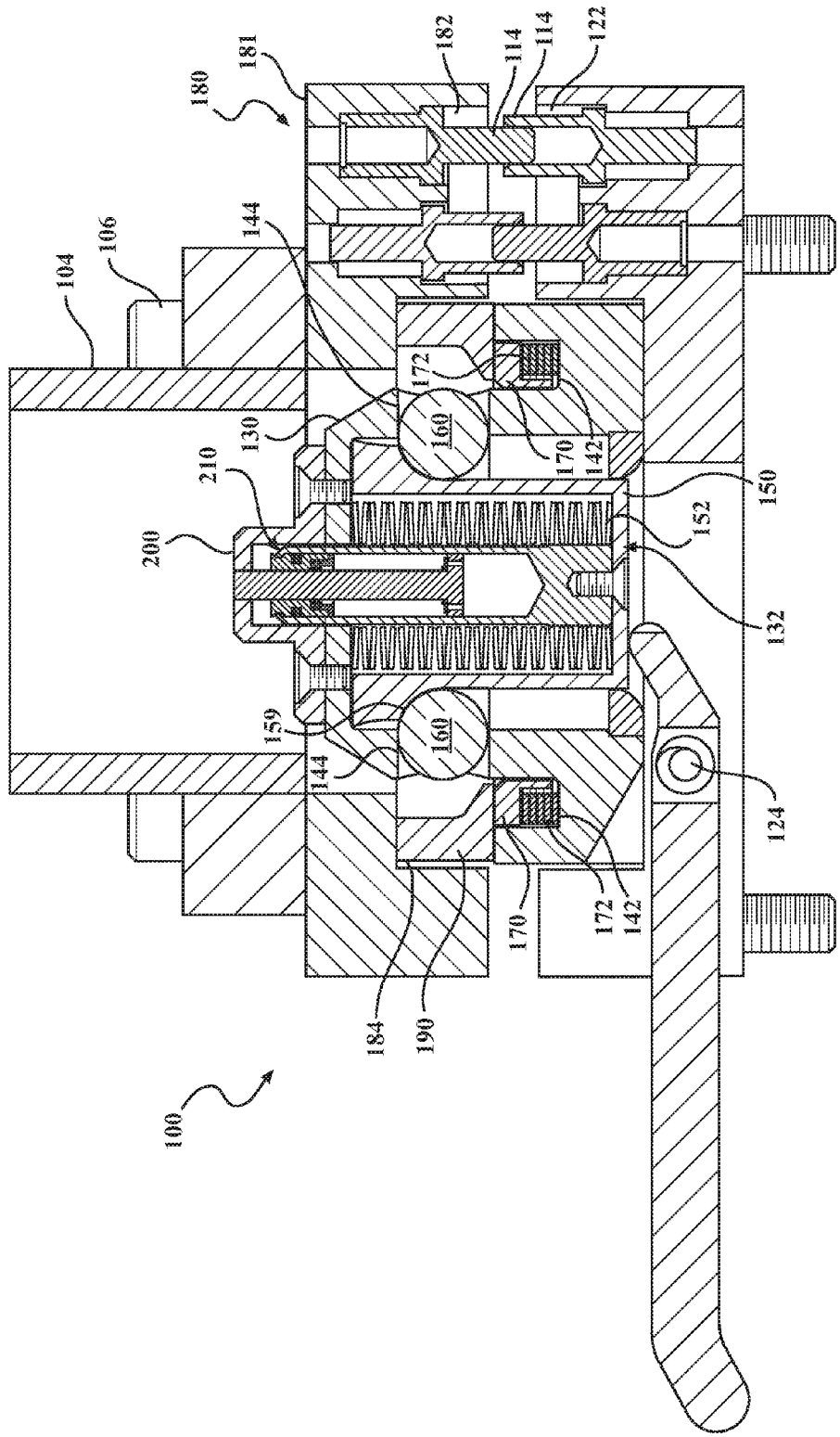
FIG. 6 is a cross-section view showing the quick disconnect apparatus of FIG. 1 in a connected position with a release lever in a release position.

As best shown in FIGS. 4-6, the receiver 110 includes a receiver base portion 120 that is connectable to the base structure 102. The mechanical code pins 114 are disposed in apertures 122 that are formed in the receiver base portion 120. The release lever 116 is pivotally connected to the receiver base portion 120 and is biased away from the release position (FIG. 4), in a clockwise direction as shown in FIG. 5, by a biasing element 124, such as a torsion spring.

The receiver 110 includes a receiver housing 130, which defines an internal cavity 132. The receiver housing 130 can extend along an axis 134. The axis 134 can extend through the internal cavity 132. In the illustrated example, the internal cavity 132 is substantially cylindrical, and the axis 134 is a central axis of the internal cavity 132.

Figure 7:
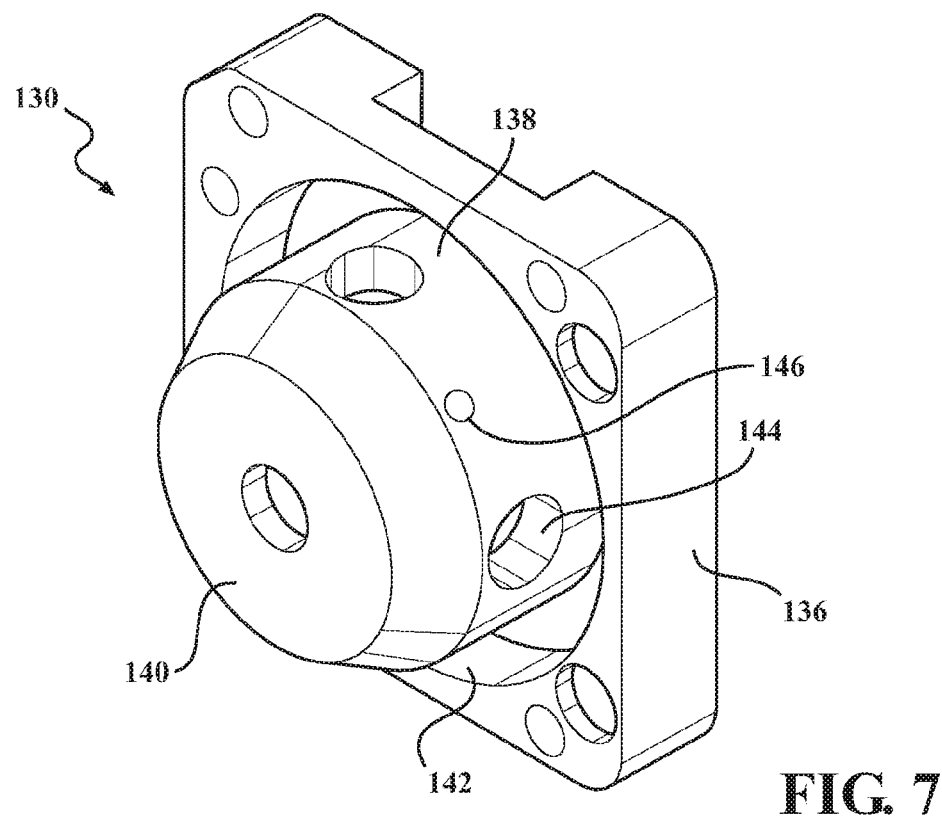
FIG. 7 is a perspective view of a receiver housing of the quick disconnect apparatus of FIG. 1.
Figure 8:
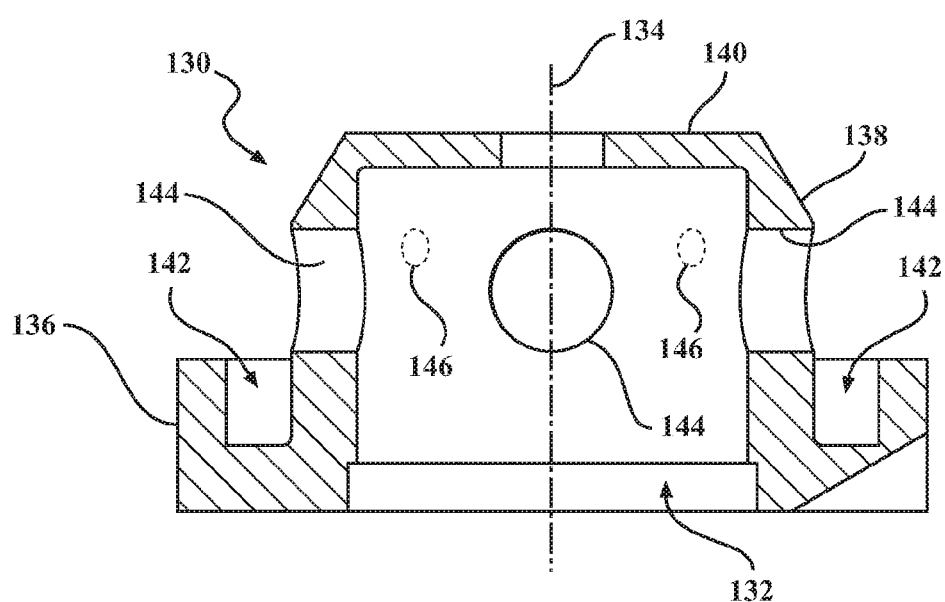
FIG. 8 is a cross-section view of the receiver housing.

As best seen in FIGS. 7-8, the receiver housing 130 includes a base 136 that is connectable to the receiver base portion 120 of the receiver 110. A substantially cylindrical wall 138 extends outward from the base 136 and substantially encircles the internal cavity 132. An end wall 140 extends transverse to the axis 134 and extends inward from the cylindrical wall 138 opposite the base 136.

The receiver 110 includes a piston 150 that is disposed within the internal cavity 132 of the receiver housing 130. The piston 150 serves as a lock actuator that causes locking and unlocking of the receiver 110 with respect to the coupler 180 by its movement within the internal cavity of the receiver housing 130. The receiver 110 also includes a biasing element such as a compression spring 152 that biases the piston 150 away from the receiver housing 130 along the axis 134. Other suitable biasing elements include a Belleville washer stack or a block of compressible elastic material. The rate of motion of the piston 150 away from the receiver housing 130 is controlled by a damper 210. The damper 210 is fixed to the piston 150 and a piston rod 212 of the damper is connected to the receiver housing 130 either directly or by a retainer 200 that is fixed to the housing by conventional fasteners or methods.

The piston 150 is engageable with a plurality of engaging members 160. In one example, the engaging members 160 are substantially spherical members, such as ball bearings.

The receiver 110 further includes a bearing retainer 170 that controls movement of the engaging member 160 with respect to the receiver housing 130. A biasing element 172 engages the bearing retainer 170 in order to bias the bearing retainer 170 away from the receiver housing 130. As examples, the biasing element 172 can be a compression spring, a Belleville washer stack, or a block of compressible elastic material. The bearing retainer 170 can be in the form of a ring-shaped member that encircles the cylindrical wall 138 of the receiver housing 130 and has an inner diameter that is complementary to the outer diameter of the cylindrical wall 138 of the receiver housing 130. In order to receive the bearing retainer 170 and the biasing element 172, a channel 142 is formed in the base 136 of the receiver housing 130. The channel 142 can be substantially circular and can substantially encircle the cylindrical wall 138.

In order to at least partially receive the engaging members 160, a plurality of ports or apertures 144 extend through the cylindrical wall 138 of the receiver housing 130. In implementations where the engaging members are spherical, the apertures 144 can be substantially circular in cross-section when viewed in a direction that is substantially perpendicular to the surface of the cylindrical wall 138. The apertures may extend through the cylindrical wall in a direction that is substantially transverse to the axis 134, such as in a radial direction relative to the cylindrical wall 138.

In order to retain the bearing retainer 170 and the biasing element 172 on the receiver housing 130 and to define a limit of travel for the bearing retainer 170, a plurality of posts 146 can extend outward from the cylindrical wall 138 of the receiver housing 130. The posts 146 can be any type of projection that extends outward from the nominal periphery of the cylindrical wall 138 of the receiver housing 130, and may be structures such as pins or ridges or bumps. The posts 146 can be formed on the cylindrical wall 138 or can be connected to the cylindrical wall 138 by any suitable means such as by threaded engagement of the posts 146 with threaded apertures (not shown) that are formed through the cylindrical wall 138. Accordingly, the bearing retainer 170 can move between a retracted position, wherein the bearing retainer 170 is disposed in the channel 142 and does not block or obstruct the apertures 144, and an extended position, wherein the bearing retainer is engaged with the posts 146 and blocks or obstructs the apertures 144. The biasing element 172 biases the bearing retainer 170 toward the extended position.

The posts 146 are positioned at radially spaced locations around the cylindrical wall 138 of the receiver housing 130. The posts 146 may be equal in number to the apertures 144, with one of the posts 146 positioned between each adjacent pair of the apertures 144.

Figure 9:
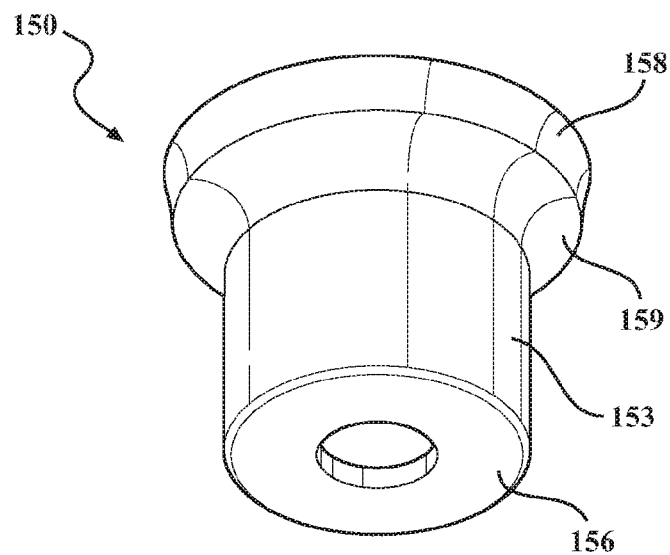
FIG. 9 is a perspective view of a piston of the quick disconnect apparatus of FIG. 1.
Figure 10:
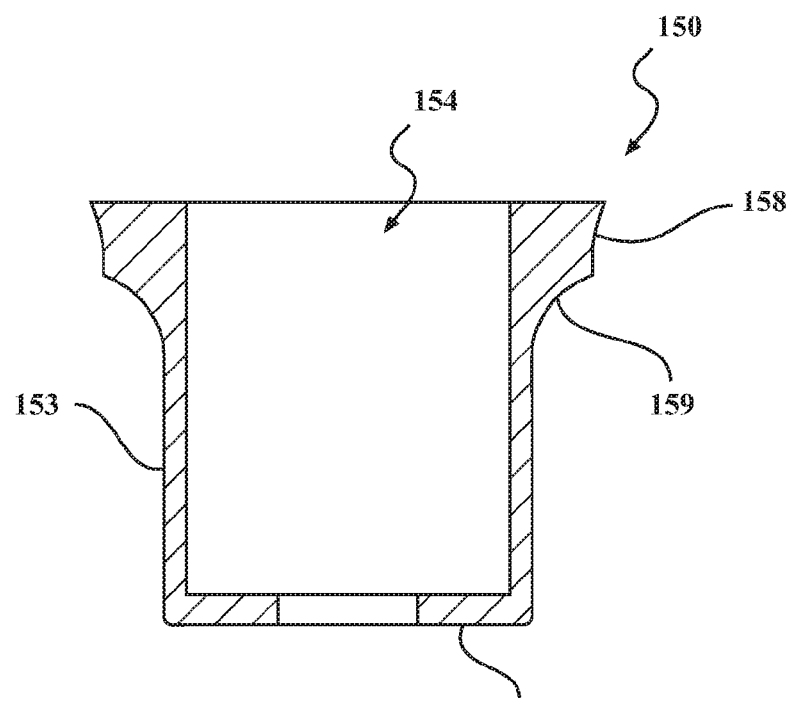
FIG. 10 is a cross-section view of the piston.

The piston 150 is best shown in FIGS. 9-10. The piston 150 can include a cylindrical wall 153 that encircles an internal cavity 154, and an end wall 156 that is connected to the cylindrical wall 153 and is disposed opposite an open end of the internal cavity 154. Adjacent to the open end of the internal cavity 154 of the piston 150, a first contoured engagement surface 158 and a second contoured engagement surface 159 can be formed around an outer periphery of the cylindrical wall 153 of the piston 150 for engagement with the engaging members 160, as will be explained in detail herein.

With reference to FIGS. 4-6, the piston 150 is moveable between a disengaged position (FIGS. 4 and 6) and an engaged position (FIG. 5). The piston 150 moves within the internal cavity 132 of the receiver housing 130 along the axis 134 under the influence of the biasing force that is applied to the piston 150 by the compression spring 152, which is disposed within the internal cavity 154 of the piston 150 such that it engages the receiver housing 130 and the piston 150.

The disengaged position of the piston 150 is established when the piston 150 is moved in response to engagement of the release lever 116 with the piston 150. In particular, when the release lever 116 is moved to the release position, the release lever 116 engages the piston 150 such that the compression spring 152 is compressed as the piston 150 moves from the engaged position toward the disengaged position.

In the disengaged position, the second contoured engagement surface 159 of the piston 150 is positioned adjacent to the apertures 144 in the receiver housing 130. Because the second contoured engagement surface 159 has a smaller maximum diameter than the first contoured engagement surface 158 and is contoured such that it is complementary to the engaging members 160, the engaging members 160 are able to move inward with respect to the receiver housing 130 and toward the second contoured engagement surface 159 of the piston 150 when the piston 150 is in the disengaged position. As an example, the size and shape of the second contoured engagement surface can allow the engaging members 160 to retract into the receiver housing 130 by a distance that is sufficient to cause the outermost portions of the engaging members to be positioned even with or inward with respect to the cylindrical wall 138 of the receiver housing 130. Thus, when the piston 150 is in the disengaged position, the biasing force applied to the bearing retainer 170 by the biasing element 172 causes the bearing retainer 170 to extend, such that it is positioned adjacent to the apertures 144 and forces the engaging members 160 to move into the apertures 144 of the receiver housing 130. Once this position is established, the bearing retainer 170 maintains the engaging members 160 in their respective positions within the apertures 144 and as a result of engagement of the engaging members 160 with the second contoured engagement surface 159 of the piston 150, the piston 150 is retained in the disengaged position after force is no longer applied to the piston 150 by the release lever 116. The disengaged position of the piston 150 continues until the bearing retainer 170 is retracted, as will be explained herein.

The bearing retainer 170 is moved from the extended position to the retracted position when the coupler 180 is moved into engagement with the receiver 110 to define the engaged position. The coupler 180 includes a coupler body 181, which is connected to the tooling assembly 104. One or more apertures 182 can be formed in the coupler body 181 for receiving the mechanical code pins 114. The coupler body 181 is connected to a coupler ring 190 that is engageable with the receiver 110 to connect the coupler 180 to the receiver 110, as will be explained in detail herein. The coupler ring 190 can be received in a recess 184 that is defined by the coupler body 181. A shoulder 186 can be formed within the recess 184.

Figure 11:
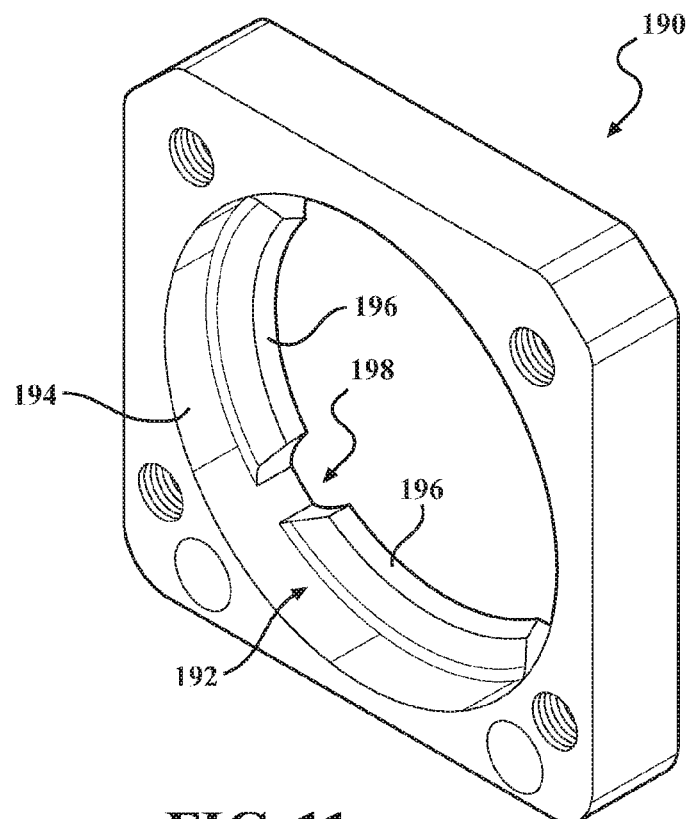
FIG. 11 is a perspective view of a coupler ring of the quick disconnect apparatus of FIG. 1.
Figure 12:
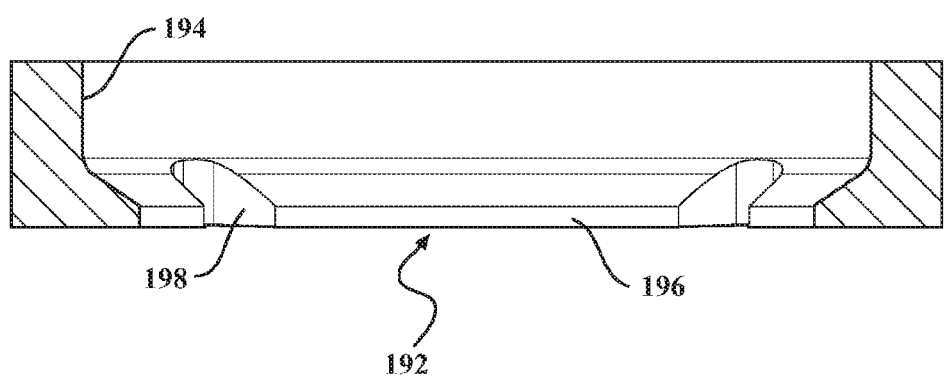
FIG. 12 is a cross-section view of the coupler ring.

As best shown in FIGS. 11-12, the coupler ring 190 can define a central opening 192, wherein at least a portion of the receiver 110 is adapted to be received within the central opening 192 of the coupler ring 190. The central opening 192 is defined in part by an annular wall 194 that extends around the central opening 192. One or more annular projections 196 extend inward from the annular wall 194 toward a radial center of the central opening 192. The annular projections 196 are adapted to engage the engaging members 160 of the receiver 110 when the receiver 110 is connected to the coupler 180. The annular projections 196 define a ring having a minimum inside diameter that is complementary to the outside diameter of the cylindrical wall 138 of the receiver housing 130. The ring defined by the annular projections 196 is interrupted by openings 198 that are formed by or disposed between adjacent pairs of the annular projections 196 to allow the posts 146 of the receiver housing 130 to move past the annular projections 196 when the receiver 110 and the coupler 180 are moved to the connected position. The openings 198 may be structures such as slots, gaps, or other types of openings.

Figure 15:
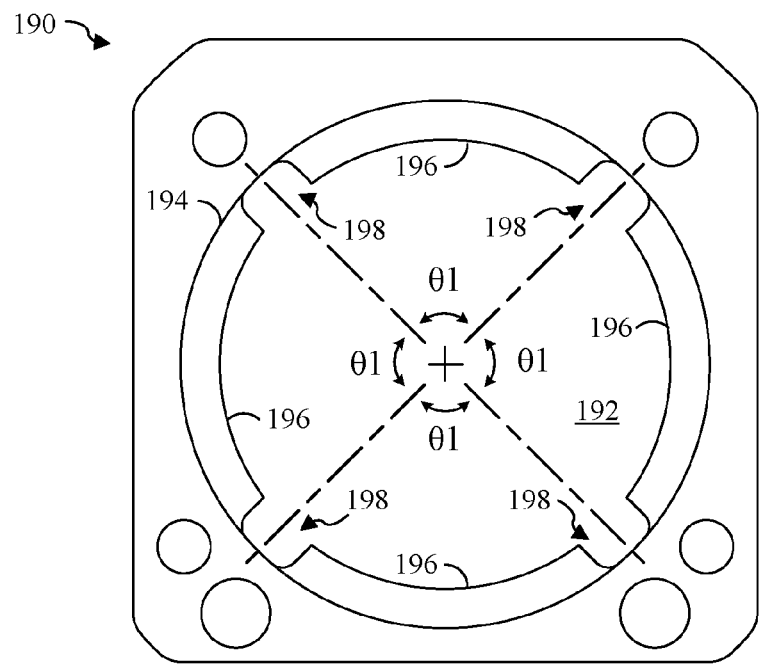
FIG. 15 is a front view of the coupler ring.
Figure 16:
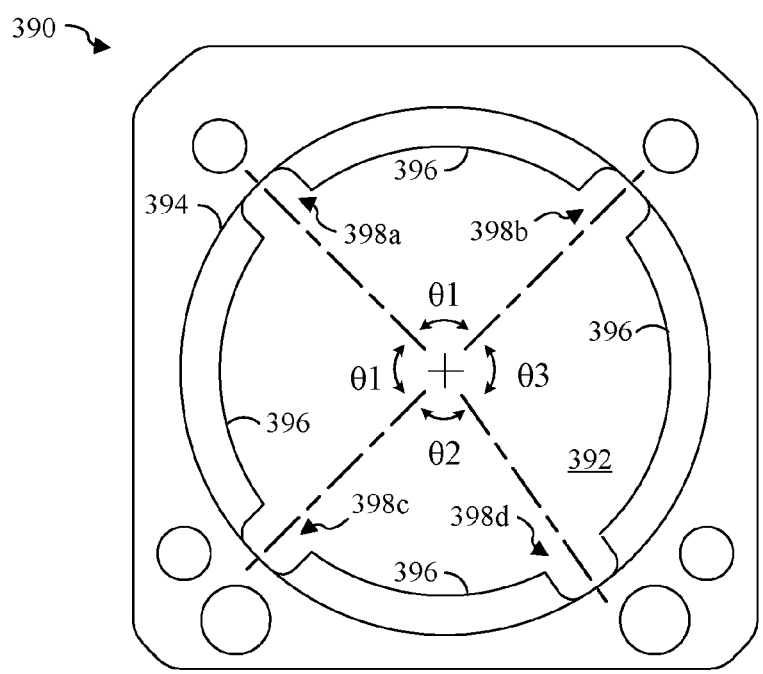
FIG. 16 is a front view of an alternative coupler ring of the quick disconnect apparatus of FIG. 1.

As shown in FIG. 15, the openings 198 of the coupler ring 190 may be evenly spaced radially around the annular wall 194 at angles θ1, where θ1 is equal to 90 degrees. As used herein, evenly spaced radially means that the angular spacing between all adjacent pairs of openings 198 is the same, as measured with respect to the radial center of the central opening 192. As shown in FIG. 16, an alternative coupler ring 390 includes a central opening 392, an annular wall 394, annular projections 396, and openings 398a, 398b, 398c, and 398d, which are all similar to corresponding parts of the coupler ring 190 except that the openings 398a, 398b, 398c, and 398d are not evenly spaced radially around the annular wall 394. This uneven radial spacing prevents installation of the coupler and receiver at an incorrect angular orientation, since the posts 146 would be arranged in correspondence with the locations of the openings 398a, 398b, 398c, and 398d and would engage the coupler ring 190 to prevent incorrect installation. In the illustrated example, opening 398a is spaced from opening 398b by angle θ1, where θ1 is equal to 90 degrees, opening 398a is spaced from opening 398c by angle θ1, opening 398a is spaced from opening 398b by angle θ1, where θ1 is equal to 90 degrees, opening 398c is spaced from opening 398d by angle θ2, where θ2 is equal to 80 degrees, and opening 398b is spaced from opening 398d by angle θ3, where θ3 is equal to 100 degrees. As used herein, unevenly spaced radially means that the angular spacing between at least one adjacent pair of openings 398a-d is not the same as the angular spacing between at least one other adjacent pair of openings 398a-d, as measured with respect to the radial center of the central opening 392.

When the coupler 180 is moved into the engaged position with respect to the receiver 110, the receiver housing 130 enters the central opening 192 of the coupler ring 190. The coupler ring 190 engages the bearing retainer 170, thereby moving the bearing retainer 170 from its extended position to its retracted position during movement of the coupler 180 toward the receiver 110. Once the bearing retainer 170 is no longer positioned adjacent to the apertures 144, the biasing force of the compression spring 152 moves the piston downward away from the receiver housing 130, and the resulting engagement of the second contoured engagement surface 159 of the piston 150 with the engaging members 160 forces the engaging members 160 outward with respect to the receiver housing 130 through the apertures 144. As best seen in FIG. 5, this places the engaging members 160 into engagement with the annular projections 196 of the coupler ring 190 while the engaging members 160 are held in place by engagement with the first contoured engagement surface 158 of the piston 150. While the engaging members 160 are held in engagement with the coupler ring 190 by the piston 150, the coupler 180 is locked in the engaged position with respect to the receiver 110. As previously described, in order to disengage the coupler 180 with respect to the receiver 110, the release lever 116 is moved to the release position, thereby compressing the compression spring 152, which allows the engaging members 160 to move into the receiver housing 130 in response to a camming action that is applied to the engaging members 160 by the wedge-like profile of the annular projections 196 of the coupler ring 190 under the influence of the bearing retainer 170 and the biasing element 172, which urges the coupler 180 away from the engaged position with respect to the receiver 110 once the engaging members 160 are free to move into the receiver housing 130.

As best shown in FIGS. 13-14, the damper 210 resists motion. In the illustrated example, motion of a damper piston that includes the piston rod 212 and a piston head 214 is resisted by passing a fluid through ports including a first group of ports 230 and a second group of ports 232. The piston rod 212 and the piston head 214 can be integrally formed or separately formed and connected in a fixed relationship. The ports of the first group of ports 230 and second group of ports 232 are defined in the piston head 214, which is fixed to the piston rod 212. The first group of ports 230 and a second group of ports 232 each allow fluid to flow past the piston head 214 as the piston head 214 moves axially.

The damper 210 includes a damper housing 216 that defines an interior space 217. The damper housing 216 may be a hollow cylindrical member and may be referred to as a damper cylinder. Fluid is disposed within the interior space 217 to resist axial movement of the piston head 214 within the interior space 217. In one implementation, the fluid is a gas. In another implementation, the fluid is a liquid such as an oil. The damper housing 216 includes a closed end and an open end. A seal assembly is disposed in the open end of the damper housing 216. The seal assembly includes a seal body 218 with an aperture 220. The piston rod 212 extends through the aperture. The seal assembly also includes a first sealing ring 222 and a second sealing ring 224. The first sealing ring 222 engages the damper housing 216 and the seal body 218. The second sealing ring engages the seal body 218 and the piston rod 212, and is retained on the seal body by a retainer ring 226.

A bore 228 at the closed end of the damper housing 216 can be used to connect the damper 210 to the piston 150 by a conventional fastener such as a screw.

The damper 210 is configured to resist motion of the piston 150 away from the receiver housing 130 under the influence of the compression spring 152. Thus, after the release lever 116 is moved to the release position, thereby compressing the compression spring 152 and moving the piston 150 toward the receiver housing 130, the piston 150 and the release lever 116 do not immediately return to the lock position. Instead, movement of the piston 150 away from the receiver housing 130 occurs slowly, at a rate determined by the force applied by the compression spring 152 and the configuration of the ports in the piston head 214. As a result, the release lever 116 need not be manually held in the release position while the coupler 180 is removed from the receiver 110. Instead, after the release lever 116 is moved to the release position, there is a time period in which the coupler 180 will be removable, until the movement of the piston 150 causes the engaging members 160 to re-engage the coupler ring 190. During this time, the coupler 180 can be supported with respect to the receiver 110 by the elongate hook 188 and the elongate flange 118.

The damper 210 can be configured to resist motion of the piston 150 toward the receiver housing 130 to a lesser degree than it resists motion of the piston 150 away from the receiver housing 130. For example, the first group of ports 230 can include one or more ports having a smaller aggregate area than that of one or more ports from the second group of ports 232. A valve member 234 is provided to block the second group of ports while the piston rod 212 of the damper 210 moves in response to motion of the piston 150 away from the receiver housing 130. This slows the rate of fluid flow through the piston head 214 and thus slows the piston 150. The valve member 234 does not block the second group of ports 232 when the piston 150 is moving toward the receiver housing 130 to provide less restriction in this direction. For example, the valve member 234 can be a rubber flap that extends around the piston rod 212, is seated against the piston head 214, and is held in place by a retainer ring 236. As fluid flows from the side of the piston head 214 on which the valve member 234 is provided, the valve member 234 covers the ports of the second group of ports 232 and the fluid flows past the piston head 214 through the first group of ports 230 but not through the second group of ports 232, because the second group of ports 232 is obstructed by the valve member 234 while the first group of ports 230 is not obstructed by the valve member 234. As fluid flows from the side of the piston head 214 opposite the valve member 234, the valve member 234 is moved away from the piston head 214 by fluid pressure to open the ports of the second group of ports 232 and the fluid flows past the piston head 214 through the first group of ports 230 and the second group of ports 232, because the first group of ports 230 and the second group of ports 232 are not obstructed by the valve member 234.

In operation, the coupler 180 is manually connected to the receiver 110 by an operator (i.e., a person). The operator aligns the coupler 180 with the receiver 110 and then slightly angles the coupler 180 upward while hooking the elongate hook 188 of the coupler 180 onto the elongate flange 118 of the receiver 110. After the elongate hook 188 is engaged with the elongate flange 118, the operator rotates the coupler 180 downward toward axial alignment with the receiver 110. During this motion, the coupler ring 190 of the coupler 180 engages the bearing retainer 170 and moves the bearing retainer 170 into the channel 142 of the receiver housing 130 by compressing the biasing element 172. As the coupler ring 190 passes the engaging members 160, the engaging members 160 are forced outward by the piston 150, which is urged away from the receiver housing 130 by the compression spring 152. The engaging members 160 are held in engagement with the interior of the coupler ring 190 by the force applied to the engaging members 160 by the piston 150 to lock the coupler 180 to the receiver 110.

When the operator wishes to release the coupler 180 from the receiver 110, the operator first pivots the release lever 116 toward the coupler 180 to the release position of the release lever 116. This moves the piston 150 toward the receiver housing 130 by compressing the compression spring 152 and releasing the force applied to the engaging members 160 by the piston 150. When the operator releases the release lever 116, the spring force applied to the piston 150 by the compression spring 152 urges the piston 150 away from the receiver housing toward the lock position, but this motion is slowed by the damper 210. Thus, the operator need not hold the release lever 116 while removing the coupler 180 from the receiver 110. Before the piston 150 causes the engaging members 160 to re-engage the coupler ring 190, the operator pivots the coupler 180 upward slightly to disengage the coupler ring 190 from the bearing retainer 170, so that the bearing retainer 170 can hold the engaging members in the receiver housing 130. The operator then lifts the coupler 180 from the receiver 110 to disengage the elongate hook 188 of the coupler 180 from the elongate flange 118 of the receiver 110.

Figure 17:
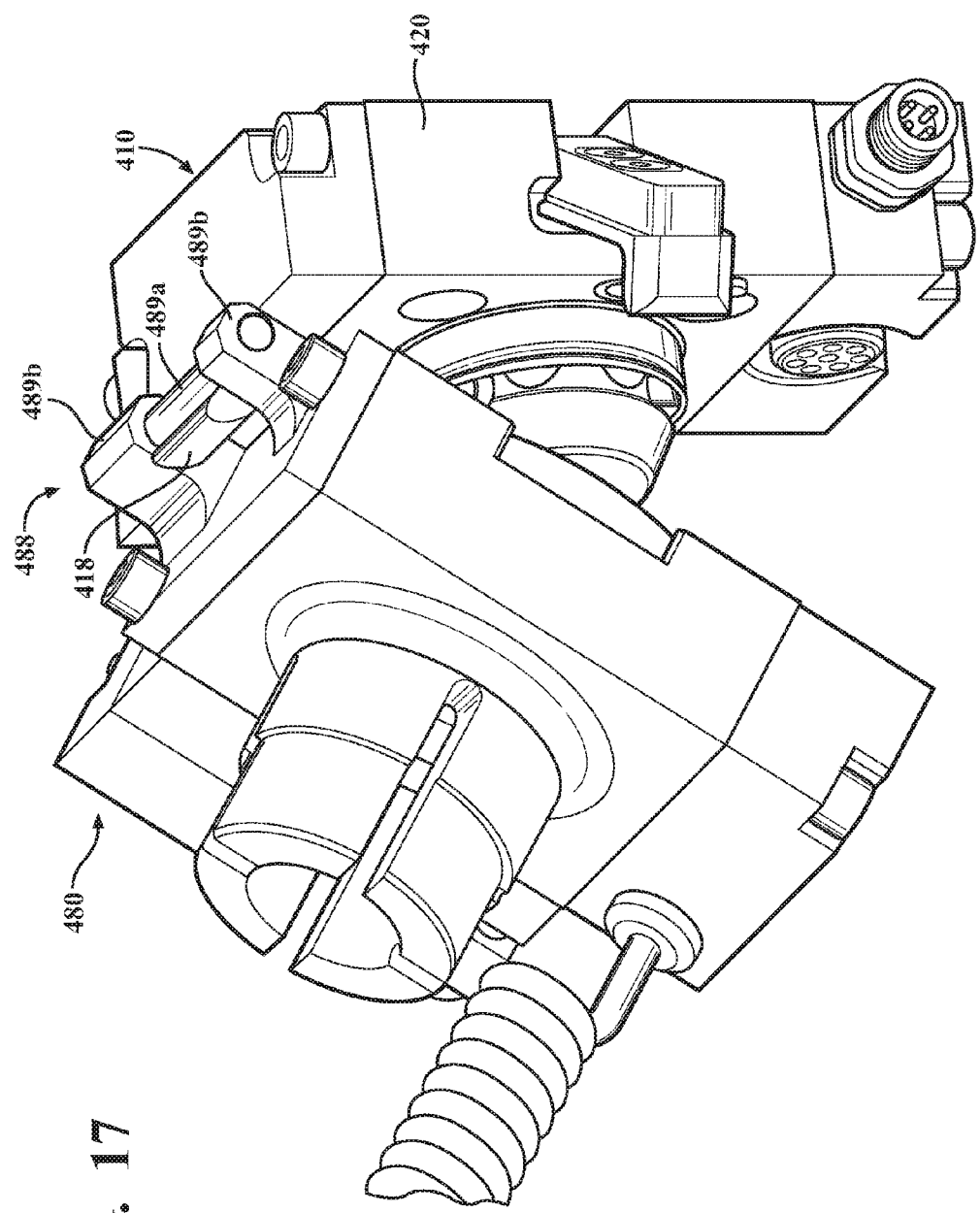
FIG. 17 is a perspective view showing a quick disconnect apparatus according to a second embodiment including a receiver and a coupler in a partially connected position in which the coupler is not secured to the receiver.
Figure 18:
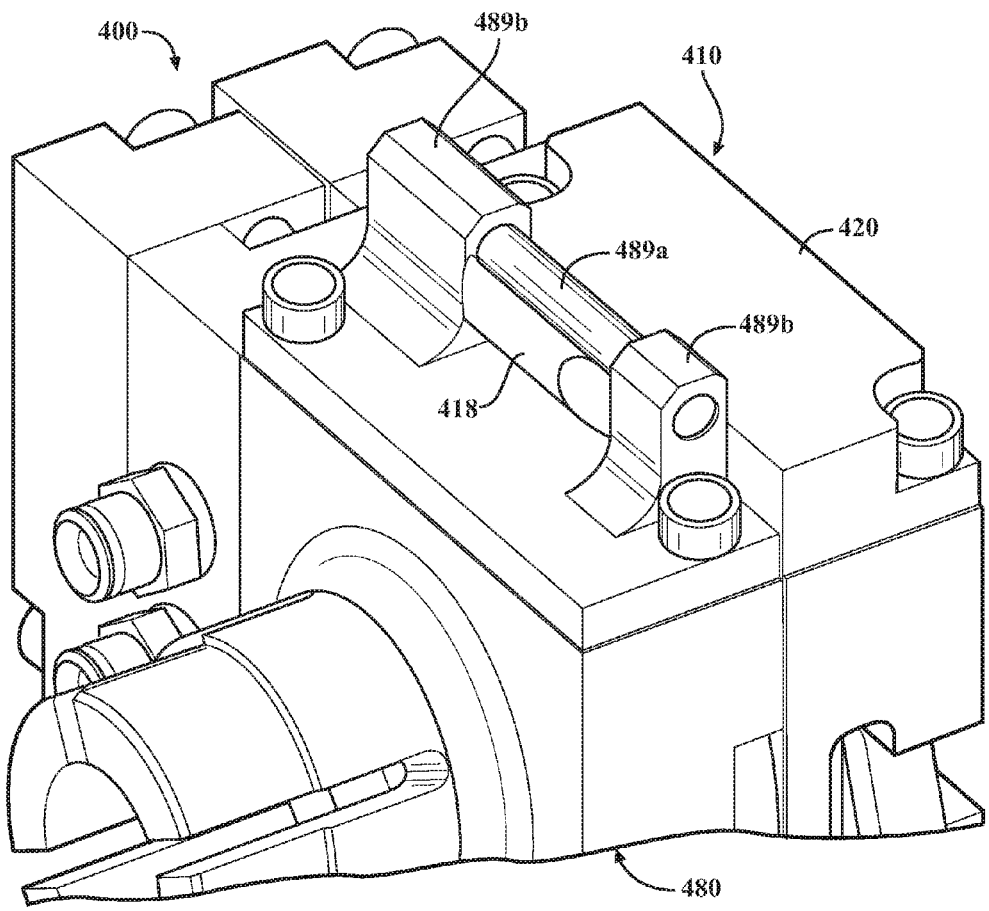
FIG. 18 is a perspective view showing the quick disconnect apparatus of FIG. 17 in a connected position in which the coupler is secured to the receiver.

FIGS. 17-18 show a quick disconnect apparatus 400 according to a second embodiment. FIG. 17 is a perspective view showing the quick disconnect apparatus including a receiver 410 and a coupler 480 in a partially connected position in which the coupler 480 is not secured to the receiver 410. FIG. 18 is a perspective view showing the quick disconnect apparatus 400 in a connected position in which the coupler 480 is secured to the receiver 410. The quick disconnect apparatus 400 is similar to the quick disconnect apparatus 100, and can include the features previously described with respect to the quick disconnect apparatus 100, except as otherwise described herein. The quick disconnect apparatus can be used with a base structure and a tooling assembly, as described with respect to the quick disconnect apparatus 100, the base structure 102, and the tooling assembly 104.

The receiver 410 and a coupler 480 are removably connectable to the receiver 410. From a disconnected position in which the receiver 410 and the coupler 480 are not in engagement with one another, the quick disconnect apparatus 400 can be moved to the partially connected position. The partially connected position is defined by supporting the coupler 480 from the receiver 410 during movement of the coupler 480 into engagement with the receiver 410.

In order to support the coupler 480 with respect to the receiver 410 while the coupler 480 is being connected to the receiver 410, the receiver 410 includes a first support part 418 and the coupler 480 includes a second support part 488. The first support part 418 and the second support part 488 are configured to allow the coupler 480 to hang from the receiver 410. In the illustrated example, the first support part 418 of the receiver 410 defines an elongate hook and the second support part 488 of the coupler 480 includes an elongate rod 489a that extends between and is supported at its ends by projections 489b that extend outward from the surrounding structure of the coupler 480 to space the elongate rod 489a from it. By placing the elongate rod 489a over the elongate hook defined by the first support part 418, the coupler 480 is supported by the receiver 410 prior to moving the coupler 480 to the connected position relative to the receiver. In addition, the first support part 418 and the second support part 488 are arranged geometrically to align the coupler 480 relative to the receiver 410 in preparation for movement to the connected position.

When the receiver 410 and the coupler 480 are in the partially connected position, they can be moved to the connected position by moving the receiver 410 and the coupler 480 toward one another. In particular, movement from the partially connected position to the connected position can be achieved by rotating the coupler 480 relative to the receiver 410 while the second support part 488 is suspended from and supported by the first support part 418. The axis of rotation of the coupler 480 relative to the receiver 410 during movement from the partially connected position to the connected position lies along the point where the second support part 488 contacts the first support part 418.

When the receiver 410 and the coupler 480 are in the connected position, they can be moved to the disconnected position by first operating a release lever 416 that can be pivoted from a lock position to a release position. When the release lever 416 reaches the release position, the lock previously established between the receiver 410 and the coupler 480 ceases, thus allowing the receiver 410 and the coupler 480 to be moved away from one another.

Figure 19:
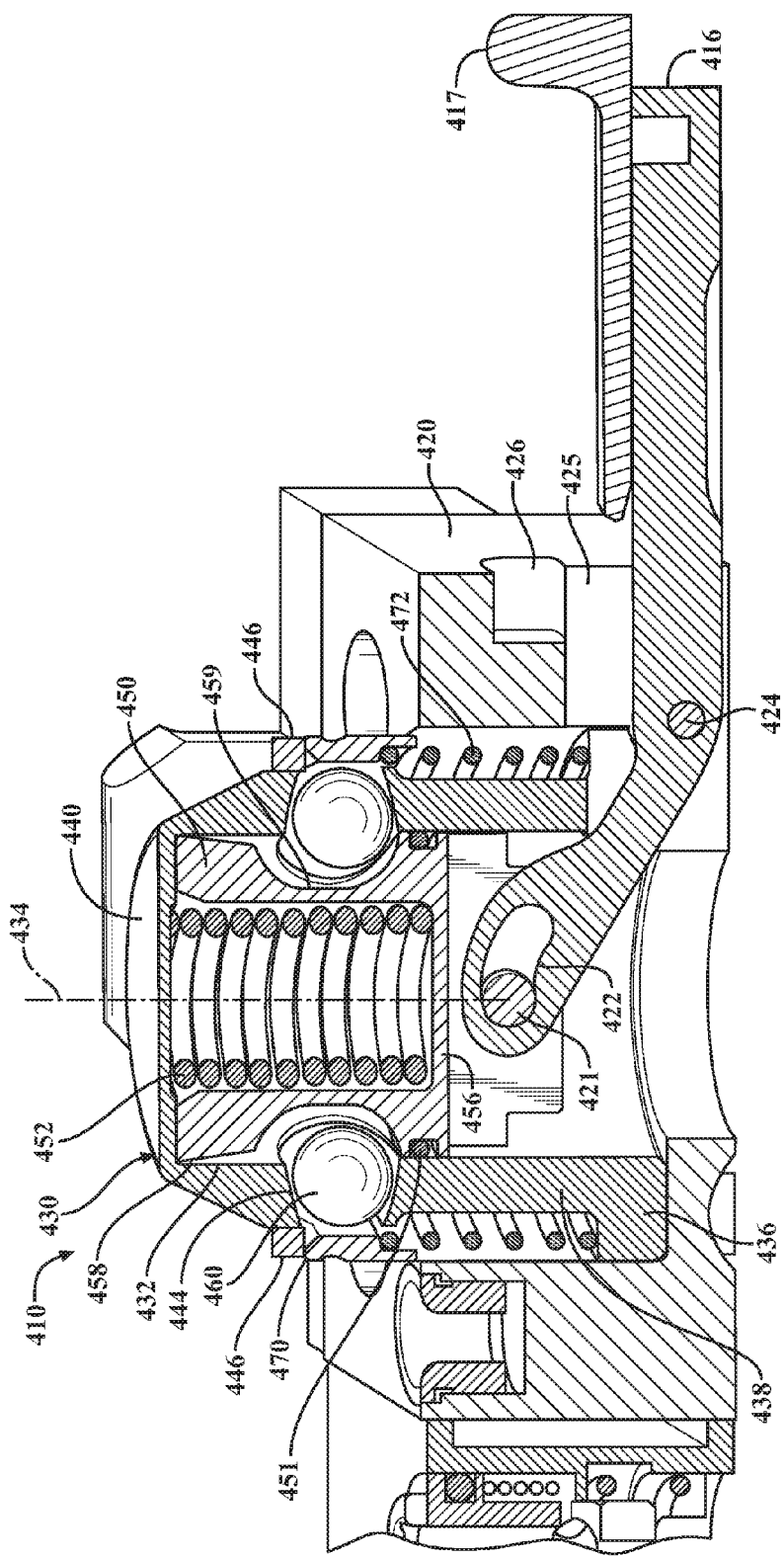
FIG. 19 is a cross-section view showing the receiver.
Figure 20:
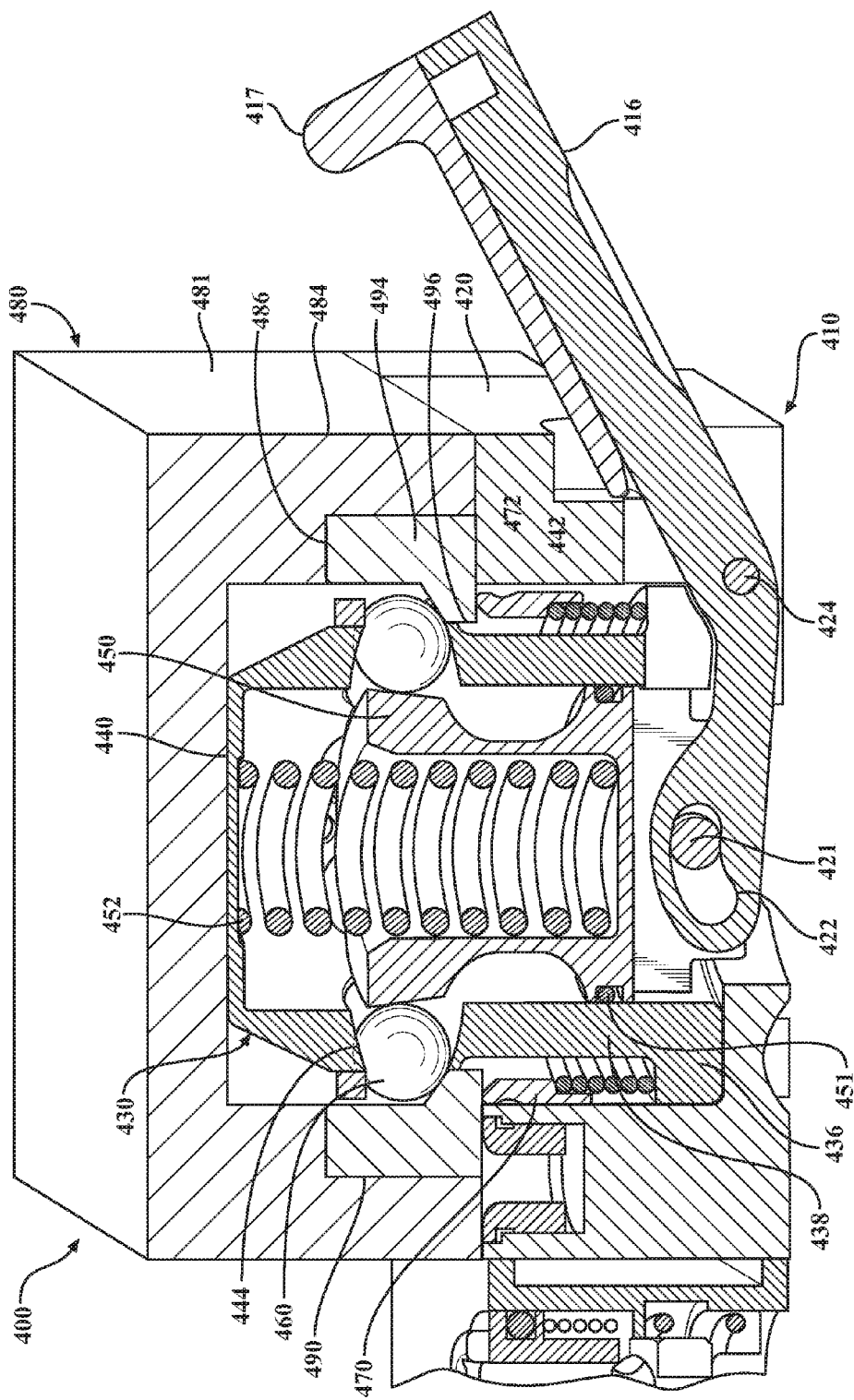
FIG. 20 is a cross-section view showing the receiver and the coupler in a connected position with a release lever in a lock position.
Figure 21:
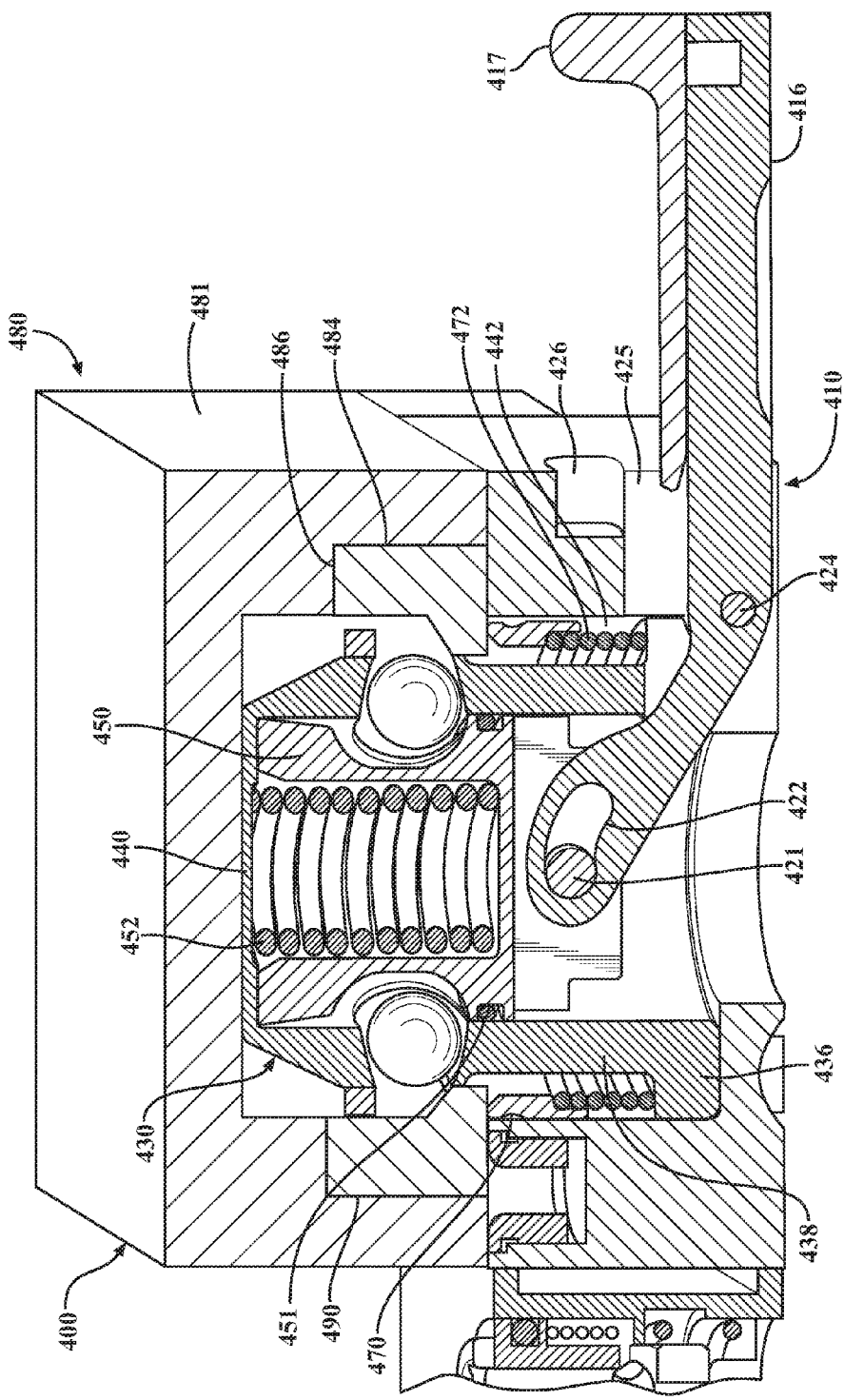
FIG. 21 is a cross-section view showing the receiver and the coupler in a connected position with a release lever in a release position.

FIG. 19-21 are cross-section views that show the quick disconnect apparatus 400 including operation of internal components during connection of the coupler 480 to the receiver 410. FIG. 19 shows the receiver 410 in the disconnected position with the release lever 416 in the release position. FIG. 20 is a cross-section view showing the receiver 410 and the coupler 480 in a connected position with a release lever in the lock position. FIG. 21 is a cross-section view showing the receiver and the coupler in the connected position with the release lever 416 in a release position.

The receiver 410 includes a receiver base 420 and a receiver housing 430. The receiver base 420 and the receiver housing 430 can be configured such that they do not move with respect to one another and, therefore, can be separate structures as illustrated or can be formed together as a single-piece housing. The release lever 416 is pivotally connected to the receiver base 420 by a pivot joint 424. The pivot joint 424 can include a pin or other suitable structure that secures the release lever 416 to the receiver base 420 in a manner than allows pivoting. The pivot joint 424 can incorporate a biasing element such as a spring or other resilient structure. The release lever 416 can be biased to its lock position by a biasing force applied through the receiver housing 430, which is biased toward the release lever 416, as will be explained.

The receiver housing 430 is similar to the receiver housing 130. The receiver housing 430 includes an internal cavity 432 that extends along an axis 434, a base 436, a cylindrical wall 438, and an end wall 440. The base 436 of the receiver housing 430 is connectable to the receiver base 420 and the cylindrical wall 438 extends outward from the base 436 to an end wall 440, while encircling the internal cavity 432 between the base 436 and the end wall 440. The end wall 440 extends transverse to the axis 434 and extends inward from the cylindrical wall 438 to define a closed end for the internal cavity 432 opposite the base 436.

The receiver 410 includes a piston 450 that is disposed within the internal cavity 432 of the receiver housing 430. The piston 450 serves as a lock actuator that causes locking and unlocking of the receiver 410 with respect to the coupler 480 by its movement within the internal cavity 432 of the receiver housing 130. The receiver 410 also includes a biasing element such as a compression spring 452, which is disposed within the internal cavity 432 such that the compression spring 452 biases the piston 450 away from the receiver housing 430 along the axis 434. Other suitable biasing elements include a Belleville washer stack or a block of compressible elastic material. The rate of motion of the piston 450 away from the receiver housing 430 is controlled by an o-ring that is positioned between an inside surface of the cylindrical wall 438 and an outside surface of the piston 450 to serve as a damper by frictional engagement and by limiting airflow into and out of the portion of the internal cavity 432 that lies between the piston 450 and the end wall 440 as the piston 450 translates along the axis 434 toward and away from the end wall 440. The damper 210 is fixed to the piston 450 and a piston rod 212 of the damper is connected to the receiver housing 430 either directly or by a retainer 200 that is fixed to the housing by conventional fasteners or methods.

The piston 450 is engageable with a plurality of engaging members 460, which may be substantially spherical members, such as ball bearings.

The receiver 410 further includes a bearing retainer 470, which may be a ring shaped element that encircles the cylindrical wall 438 of the receiver housing 430 to retain the engaging members 460 with respect to the receiver housing 430. A biasing element 472 urges the bearing retainer 470 away from the receiver housing 430. As examples, the biasing element 472 can be a compression spring, a Belleville washer stack, or a block of compressible elastic material. The bearing retainer 470 and the biasing element 472 may be located in a channel 442 that is formed in the base 436 of the receiver housing 430 around the cylindrical wall 438.

The engaging members 460 can be located in ports or apertures 444 that extend through the cylindrical wall 438 of the receiver housing 430. In implementations where the engaging members 460 are spherical, the apertures 444 can be substantially circular in cross-section when viewed in a direction that is substantially perpendicular to the surface of the cylindrical wall 438. The apertures may extend through the cylindrical wall 438 in a direction that is substantially transverse to the axis 434, such as in a radial direction relative to the cylindrical wall 438.

Posts 446 can be formed on or connected to the cylindrical wall 438 to retain and limit travel of the bearing retainer 470 and the biasing element 472. Accordingly, the bearing retainer 470 can move between a retracted position when external force is applied, and to an extended position in response to the biasing force applied by the biasing element 472 when the external force is removed. The bearing retainer 470 is disposed in the channel 442 and does not block or obstruct the apertures 444 in the retracted position, and is engaged with the posts 446 and blocks or obstructs the apertures 444 in the extended position.

The piston 450 can include a cylindrical wall 453, an internal cavity 454, and an end wall 456 that is disposed opposite an open end of the internal cavity 454. Adjacent to the open end of the internal cavity 454 of the piston 450, a first contoured engagement surface 458 and a second contoured engagement surface 459 can be formed around an outer periphery of the cylindrical wall 453 of the piston 450 for engagement with the engaging members 460 to cause radial motion of the engaging members 460 in response to translation of the piston along the axis 434.

The piston 450 is moveable between a disengaged position (FIGS. 19 and 21) and an engaged position (FIG. 20). The piston 450 moves within the internal cavity 432 of the receiver housing 430 along the axis 434. Movement of the piston 450 is attributable to forces applied to the piston 450 by the compression spring 452 and the release lever 416, which can be used to apply a force in opposition to the compression spring 452.

The engaged position of the piston 450 is established with the release lever 416 in the lock position. Because the compression spring 452 is disposed within the internal cavity 454 of the piston 450 such that it engages the receiver housing 430 and the piston 450, it urges the piston 450 away from the end wall 440 of the receiver housing when it is not opposed by a force applied by the release lever 416. In the engaged position, the piston 450 is spaced from the end wall 440 within the internal cavity 432 of the receiver housing 430 along the axis 434 under the influence of the biasing force that is applied to the piston 450 by the compression spring 452.

The disengaged position of the piston 450 is established when the piston 450 is moved in response to movement of the release lever 416 with respect to the piston 450. In the illustrated example, the release lever 416 is connected to the piston 450 by a pin 421 that is connected to the bottom of the piston 450. The pin 421 extends through a slot 422 that is defined through the release lever 416. Thus, for example, when the release lever 416 is moved to the release position, the release lever 416 engages the piston 450 such that the compression spring 452 is compressed as the piston 450 moves from the engaged position toward the disengaged position.

In the disengaged position, the second contoured engagement surface 459 of the piston 450 is positioned adjacent to the apertures 444 in the receiver housing 430. Because the second contoured engagement surface 459 has a smaller maximum diameter than the first contoured engagement surface 458 and is contoured such that it is complementary to the engaging members 460, the engaging members 460 are able to move inward with respect to the receiver housing 430 and toward the second contoured engagement surface 459 of the piston 450 when the piston 450 is in the disengaged position. As an example, the size and shape of the second contoured engagement 459 surface can allow the engaging members 460 to retract into the receiver housing 430 by a distance that is sufficient to cause the outermost portions of the engaging members 460 to be positioned even with or inward with respect to the cylindrical wall 438 of the receiver housing 430. Thus, when the piston 450 is in the disengaged position, the biasing force applied to the bearing retainer 470 by the biasing element 472 causes the bearing retainer 470 to extend, such that it is positioned adjacent to the apertures 444 and forces the engaging members 460 to move into the apertures 444 of the receiver housing 430. Once this position is established, the bearing retainer 470 maintains the engaging members 460 in their respective positions within the apertures 444 and as a result of engagement of the engaging members 460 with the second contoured engagement surface 459 of the piston 450, the piston 450 is retained in the disengaged position after force is no longer applied to the piston 450 by the release lever 416. The disengaged position of the piston 450 continues until the bearing retainer 470 is retracted, as will be explained herein.

The bearing retainer 470 is moved from the extended position to the retracted position when the coupler 480 is moved into engagement with the receiver 410 to define the engaged position. The coupler 480 includes a coupler body 481, which is connected to the tooling assembly 404. The coupler body 481 is connected to a coupler ring 490 that is engageable with the receiver 410 to connect the coupler 480 to the receiver 410, as will be explained in detail herein. The coupler ring 490 can be received in a recess 484 that is defined by the coupler body 481. A shoulder 486 can be formed within the recess 484.

The coupler ring 490 is similar to the coupler ring 190, and includes a central opening defined in part by an annular wall 494 that encircles the central opening and annular projections 496 that extend inward from the annular wall 494 toward a radial center of the central opening. The annular projections 496 are adapted to engage the engaging members 460 of the receiver 410 when the receiver 410 is connected to the coupler 480. The annular projections 496 define a ring having a minimum inside diameter that is complementary to the outside diameter of the cylindrical wall 438 of the receiver housing 430. Openings such as slots or gaps can be formed by or disposed between adjacent pairs of the annular projections 496 to allow passage of the posts 446 past the annular projections 496.

Figure 22:
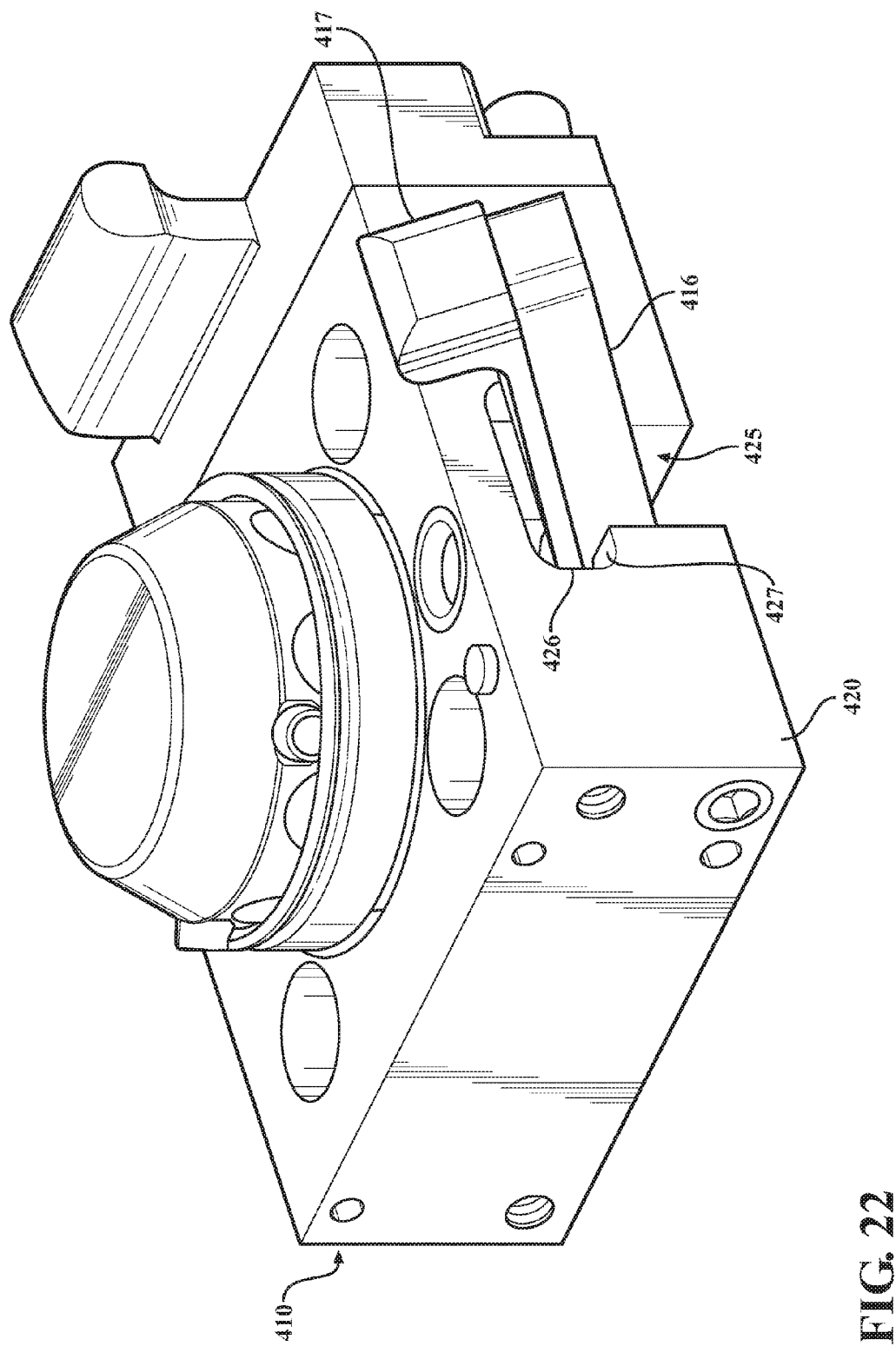
FIG. 22 is a perspective view showing the receiver.

FIG. 22 is a perspective view showing the receiver including the release lever 416 in the lock position, and an anti-release mechanism 417 in an engaged position. The release lever 416 is positioned in a slot 425 that is formed in the receiver base 420 of the receiver 410. The slot 425 extends upward from a bottom surface of the receiver base 420 to a pocket 426. The pocket 426 includes an engagement surface 427 that is configured to engage the anti-release mechanism 417 when the anti-release mechanism 417 is in the engaged position. Because the anti-release mechanism 417 is connected to the release lever 416, engagement of the anti-release mechanism 417 with the engagement surface 427 prevents the release lever 416 from moving from the lock position to the release position while the anti-release mechanism is in the engaged position.

As previously described, the release lever 416 is pivotally connected to the receiver base 420, and provision of the slot 425 provides a space in which the release lever 416 can pivot. To accommodate the release lever 416, the slot 425 is slightly wider than the release lever 416. For example, the width of the slot 425 can be larger than the width of the release lever 416 by a small gap intended to provide space for assembly variations and ensure smooth motion of the release lever 416.

The pocket 426 is wider than the slot 425. The engagement surface 427 is located at one side of the slot 425 within the pocket. In the illustrated example, the engagement surface 427 is in the form of a shoulder that is positioned laterally adjacent to the release lever 416 when the release lever 416 is in the lock position. To engage the engagement surface 427 and restrain movement of the release lever 416, the anti-release mechanism 417 is connected to the release lever 416. In the illustrated example, the anti-release mechanism 417 is a plate-like structure that is connected to a top surface of the release lever 416. The anti-release mechanism 417 is wider than the release lever 416 and is narrower than the pocket 426. The width of the anti-release mechanism 417 allows it to be received in the pocket 426 and engage a surface inside the pocket 426, such as the engagement surface 427, so that the release lever 416 cannot be moved to the release position when the anti-release mechanism 417 is engaged.

Figure 23:
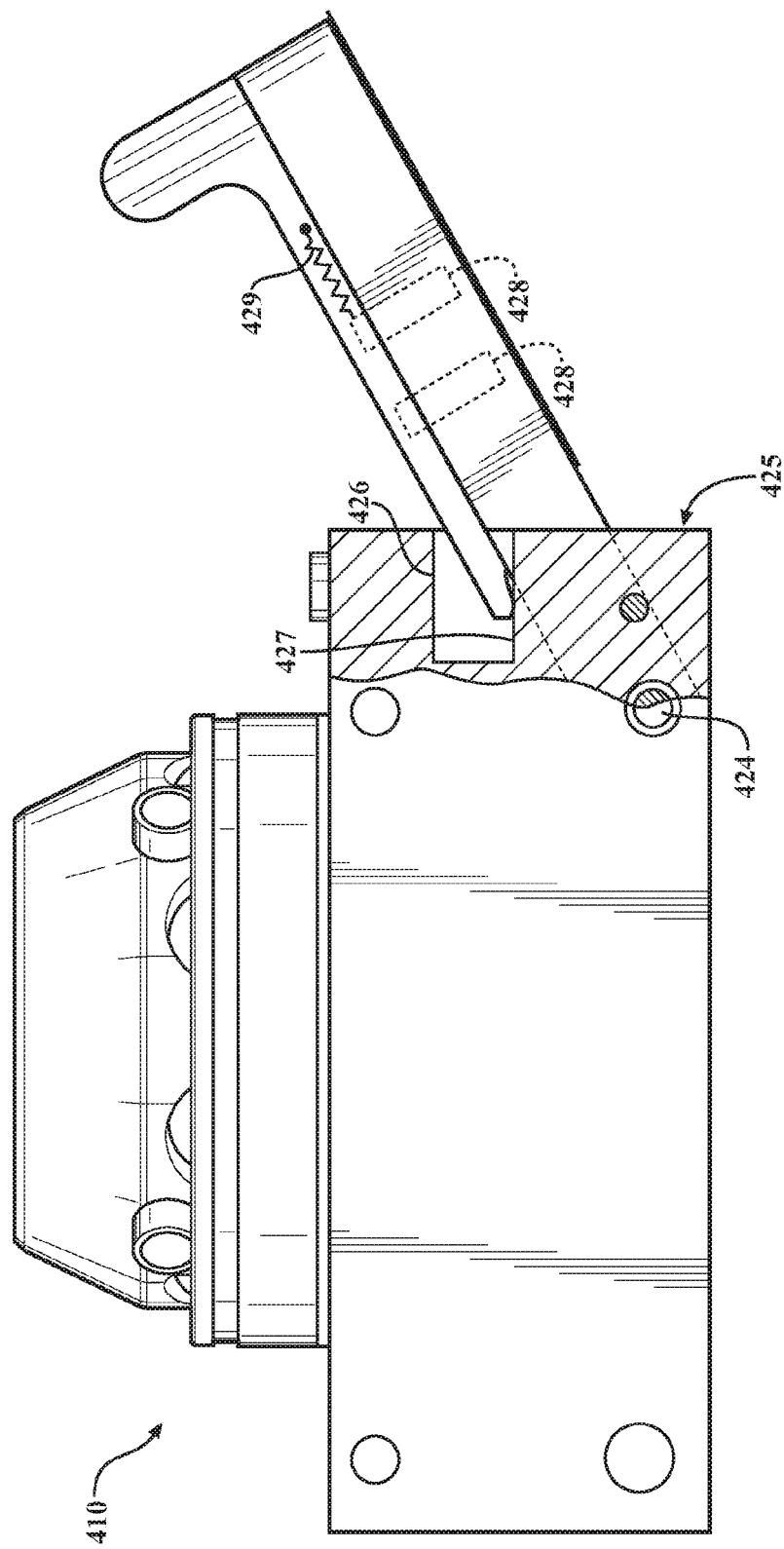
FIG. 23 is a side view showing the release lever and an anti-release mechanism of the receiver with the release lever in the lock position and the anti-release mechanism in an engaged position.
Figure 24:
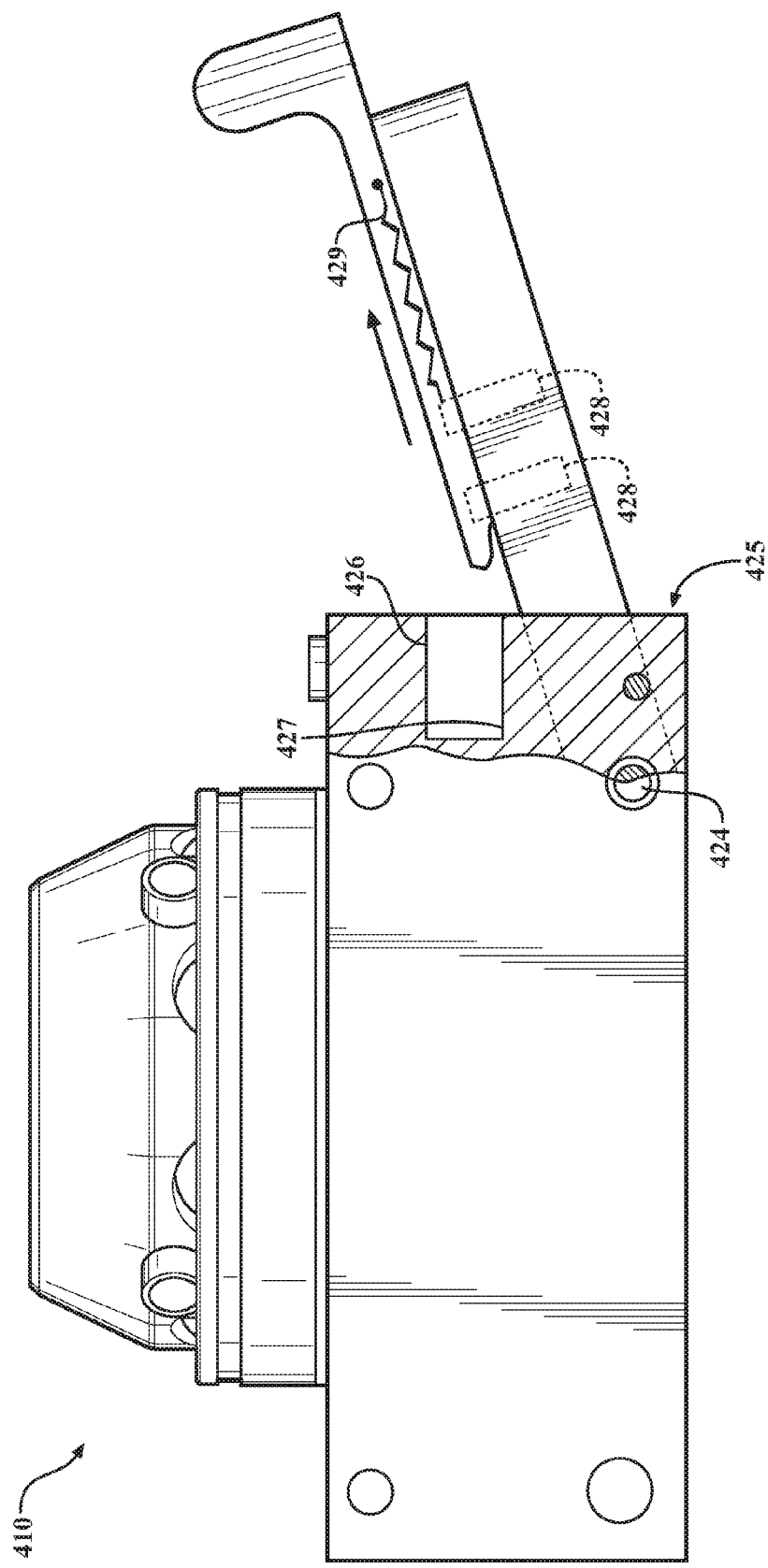
FIG. 24 is a side view showing the release lever and the anti-release mechanism of the receiver with the release lever in an intermediate position between the lock position and the release position, and the anti-release mechanism in a disengaged position.

The anti-release mechanism 417 is moveable from the engaged position to a disengaged position, as best seen in FIGS. 23-24. In particular, FIG. 23 is a side view showing the release lever 416 and the anti-release mechanism 417 with the release lever 416 in the lock position and the anti-release mechanism 417 in an engaged position, while FIG. 24 is a side view showing the anti-release mechanism 417 in a disengaged position and the release lever 416 in an intermediate position between the lock position and the release position. In FIG. 23, an end portion of the anti-release mechanism 417 is in engagement with the engagement surface 427 of the pocket 426, while the release lever 416 is disposed primarily in the slot 425. Since the anti-release mechanism 417 is too wide to move downward into the slot 425, the release lever 416 is prevented from moving downward toward the release position.

To allow movement of the anti-release mechanism 417 to the disengaged position, the anti-release mechanism 417 is moveable relative to the release lever 416. In the illustrated example, the anti-release mechanism 417 includes one or more pins 428 that define a sliding joint that connects the anti-release mechanism 417 to the top of the release lever 416. The sliding joint defined by the pins 428 allows the anti-release mechanism 417 to slide along the top of the release lever 416 toward and away from the pocket 426. The anti-release mechanism 417 can be urged toward the engaged position by a resilient element such as a spring 429, which in the illustrated example is a tension spring. In FIG. 24, the anti-release mechanism has been slid away from the receiver base 420 such that the end portion of the anti-release mechanism 417 is positioned outward from the pocket 426. In this position, the anti-release mechanism 417 does not engage the engagement surface 427 and the release lever 416 is free to move downward in the slot 425 toward the release position so that the coupler 480 can be removed from the receiver 410.

FIGS. 25-28 show a hold-open mechanism 510. The hold-open mechanism 510 includes a first bore 512, a sensor pin 514, a plug 516, and a first compression spring 518. The hold-open mechanism 510 also includes a second bore 520, a holding pin 522 that has an end portion 524, a port 526, a second compression spring 528, and an end surface 530. The hold-open mechanism 510 aids removal of the coupler 480 from the receiver 410. In particular, the hold-open mechanism 510 holds the release lever 416 in the release position, so that an operator can move the release lever 416 to the release position and then use both hands to remove the coupler 480, without the need to continue holding the release lever 416. The hold-open mechanism 510 restrains movement of the release lever 416 from the release position back to the lock position, which would otherwise occur as a result of the biasing force applied to the release lever 416 by the receiver housing 430, until the coupler 480 has been removed from the receiver 410.

The first bore 512 is formed in the receiver base 420 and extends parallel to the axis 434 of the receiver housing 430. The first bore 512 extends from an open end at an upper surface 532 of the receiver base 420 toward a bottom surface 534 of the receiver base 420. The sensor pin 514, the plug 516, and the first compression spring 518 are disposed in the first bore 512. A first end 536 of the sensor pin 514 is able to extend out of the open end of the first bore 512 and upward from the upper surface 532 of the receiver base 420 such that the coupler 480 will contact the first end 536 of the sensor pin 514 when the coupler 480 is connected to the receiver 410. The sensor pin 514 can have a stepped profile and engage a shoulder 538 in the first bore 512 to limit upward travel of the first end 536 of the sensor pin 514 to a maximum height above the upper surface 532 of the receiver base 420.

A second end 537 of the sensor pin 514 extends into an open end of the plug 516 and engages the first compression spring 518, which is located in an internal bore of the plug 516 between the second end 537 of the sensor pin 514 and a closed end of the plug 516. The first compression spring 518, therefore, urges the plug 516 away from the sensor pin 514. Opposite the sensor pin 514, a taper 519 is formed on the end of the plug 516, such that the taper 519 faces the second bore 520.

The second bore 520 is formed in the receiver base 420 and extends perpendicular to the first bore 512, from a side surface 540 of the receiver base 420 to the port 526, which extends from the second bore 520 to the slot 425. The holding pin 522 is located in the second bore 520 and is able to slide along the second bore 520. The holding pin 522 includes an end portion 524 that is smaller in diameter than the port 526, such that the end portion 524 is able to extend out of the port 526 for engagement with a feature that is formed on the release lever 416, such as a shoulder 542 that is defined in a recess 543 on the release lever 416. When the end portion 524 extends out of the port 526, the remainder of the holding pin 522 engages the wall of the receiver base 420 in the area surrounding the port 526.

The holding pin 522 is urged toward the port 526 by the second compression spring 528. The second compression spring 528 is disposed in the second bore 520 between the holding pin 522 and the end surface 530 of the second bore 520. In the illustrated example, the end surface 530 is formed on a plug that is located in the second bore 520 and is threadedly connected to the second bore 520 adjacent to the side surface 540 of the receiver base 420. The second compression spring 528 engages the holding pin 522 adjacent to a taper 523 that is formed on the holding pin 522, faces toward the end surface 530, and is located generally in the area where the first bore 512 intersects the second bore 520.

Figure 25:
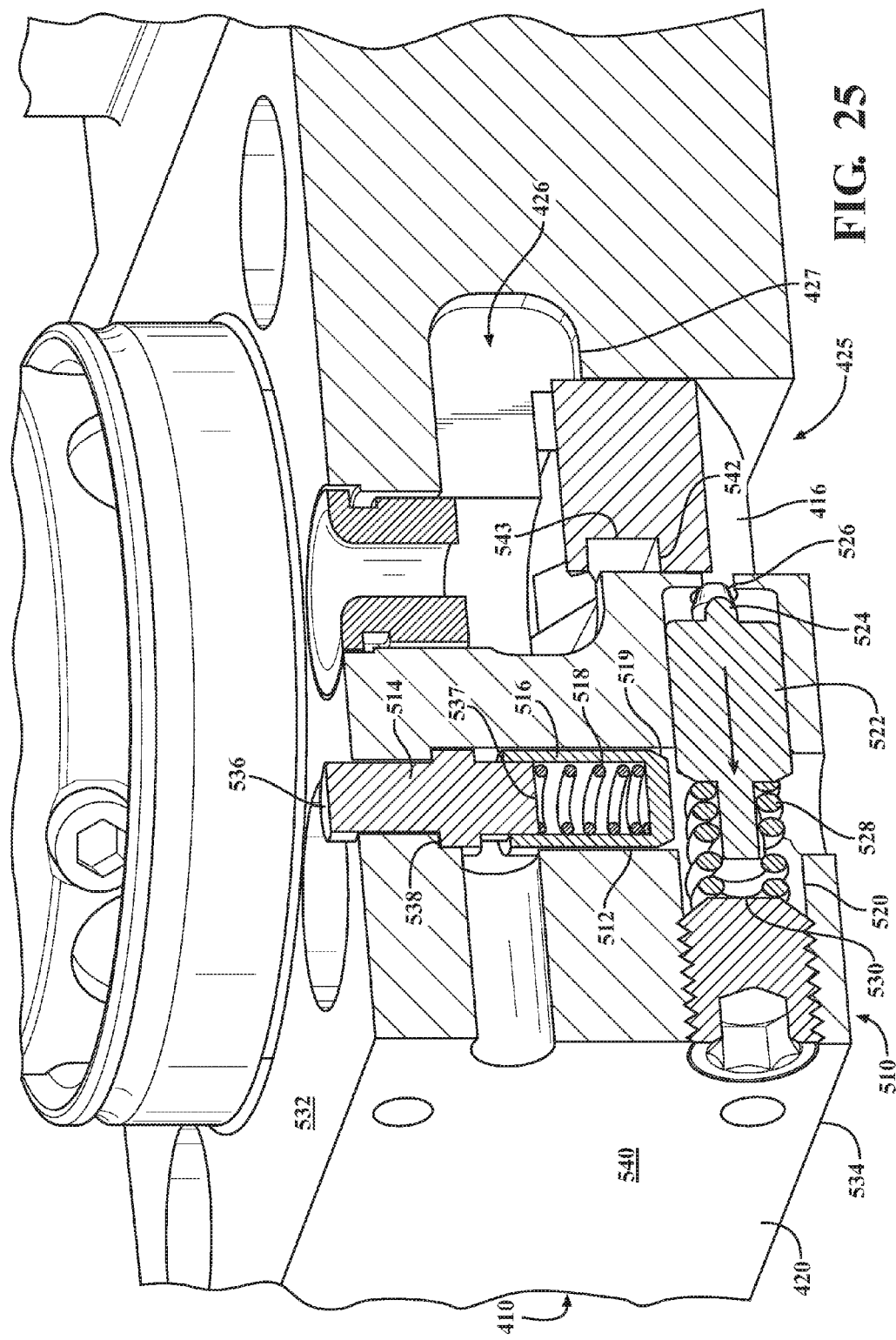
FIG. 25 is a cross-section view showing the receiver with the release lever in the lock position and a hold-open mechanism of the receiver in a first position.

A first position of the hold-open mechanism 510 is seen in FIG. 25, which is a cross-section view showing the receiver 410 with the release lever 416 in the lock position. The coupler 480 is not connected to the receiver 410. Because of this, the sensor pin 514 is free to extend out of the first bore 512 with the first end 536 of the sensor pin located above the upper surface 532 and the body of the sensor pin 514 engaged with the shoulder 538 in the first bore 512. The sensor pin 514 is urged to this position by the first compression spring 518 and thereby defines a first position relative to the plug 516 in which a relatively small length of the sensor pin 514 is located inside the plug 516. The plug 516 engages a peripheral surface of the holding pin 522 and is restrained from moving into the second bore 520 by engagement with the peripheral surface of the holding pin 522.

With the release lever 416 in the lock position, the end portion 524 of the holding pin 522 engages a side surface of the release lever 416. By this engagement, the end portion 524 is restrained from further extension out of the port 526, thereby defining a minimum degree of extension out of the port 526 for the end portion 524. In this position, the second compression spring 528 is compressed and the peripheral surface of the holding pin 522 is in engagement with the plug 516, as previously described.

Figure 26:
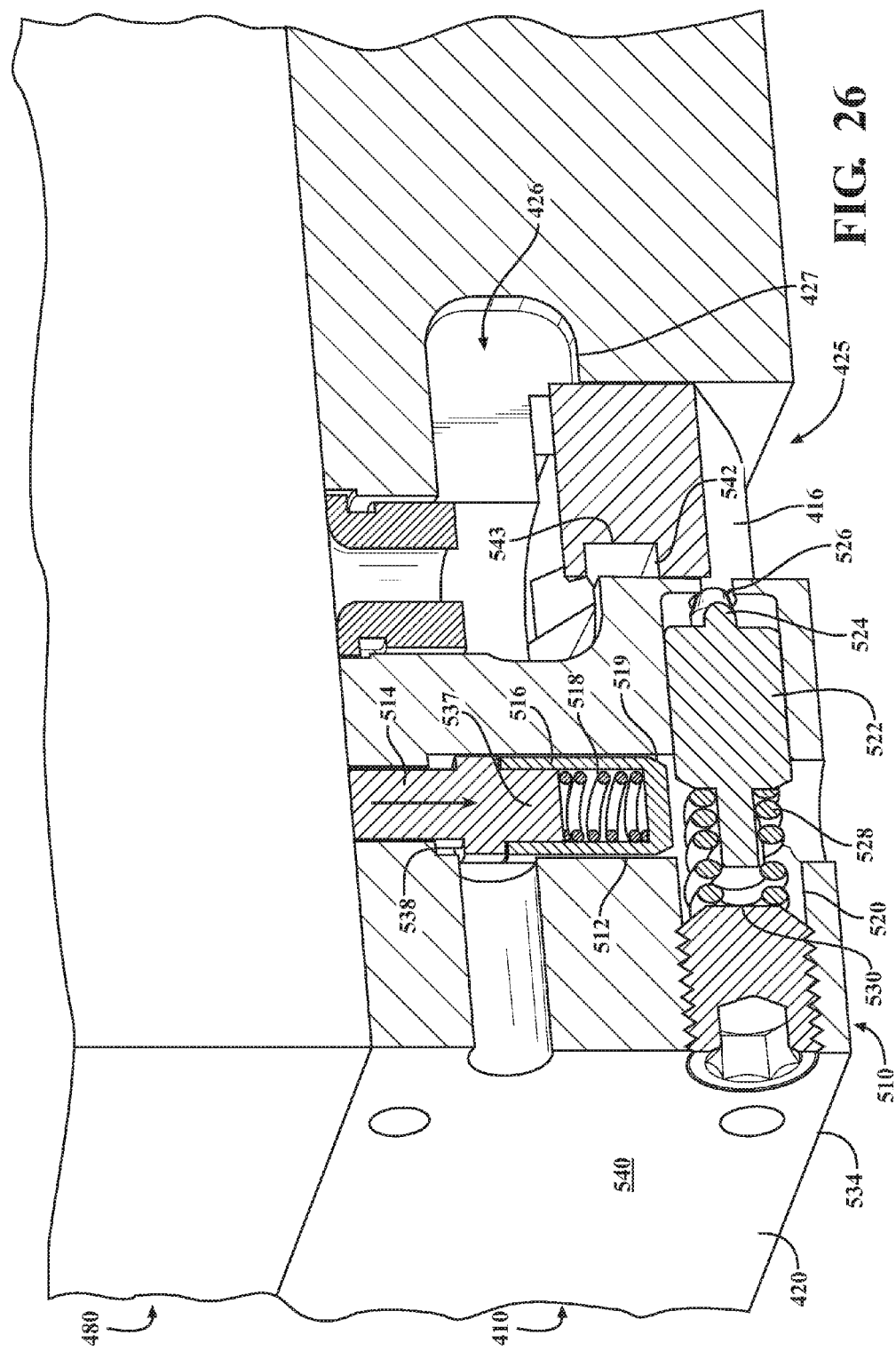
FIG. 26 is a cross-section view showing the receiver connected to the coupler with the release lever in the lock position and the hold-open mechanism in a second position.

A second position of the hold-open mechanism 510 is seen in FIG. 26, which is a cross-section view showing the receiver 410 connected to the coupler 480 with the release lever 416 in the lock position. In the second position of the hold-open mechanism 510, the coupler 480 has been connected to the receiver 410. Engagement of the coupler 480 with the first end 536 of the sensor pin 514 has moved the sensor pin 514 downward in the first bore 512 against the urging force applied by the first compression spring 518, thereby compressing the first compression spring 518. The holding pin 522 has not moved relative to the first position as described in connection with FIG. 26. Because of this, the plug 516 remains in engagement with the peripheral surface of the holding pin 522 and has not moved in response to the downward motion of the sensor pin 514.

Figure 27:
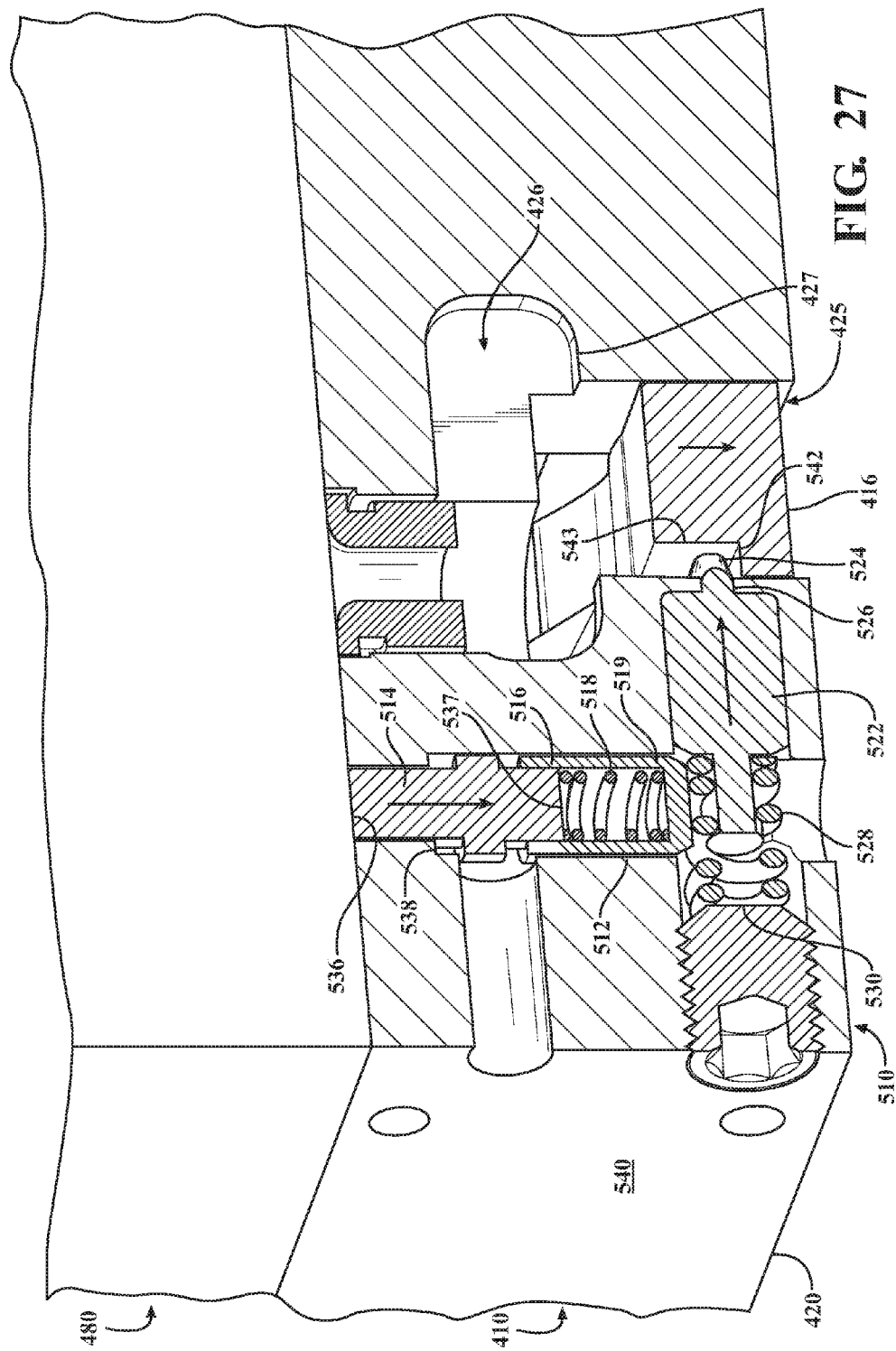
FIG. 27 is a cross-section view showing the receiver connected to the coupler with the release lever in the release position and the hold-open mechanism in a third position.

A third position of the hold-open mechanism 510 is seen in FIG. 27, which is a cross-section view showing the receiver 410 connected to the coupler 480 with the release lever 416 in the release position. In the third position, the coupler 480 remains connected to the receiver 410, and the release lever 416 has been moved to the release position. Movement of the release lever 416 to the release position aligns the recess 543 of the release lever 416 with the port 526, which allows the holding pin 522 to translate along the second bore 520 toward the release lever 416, and causes the end portion 524 of the holding pin 522 to enter the recess 543 of the release lever 416.

Translation of the holding pin 522 along the second bore 520 toward the release lever 416 shifts the taper 523 toward the port 526 such that the plug 516 is able to move downward along the first bore 512 under the influence of the first compression spring 518 such that the taper 519 at the end of the plug 516 engages the taper 523 on the holding pin 522. Engagement of the taper 519 at the end of the plug 516 with the taper 523 on the holding pin 522 prevents the holding pin 522 from translating away from the release lever 416 along the second bore 520. Therefore, while the sensor pin 514 remains disposed fully in the first bore 512 by engagement with the coupler 480, the plug 516 continues to block movement of the holding pin 522, which maintains the end portion of the holding pin in the recess 543 of the release lever 416 and in engagement with the shoulder 542 to keep the release lever 416 in the release position.

Figure 28:
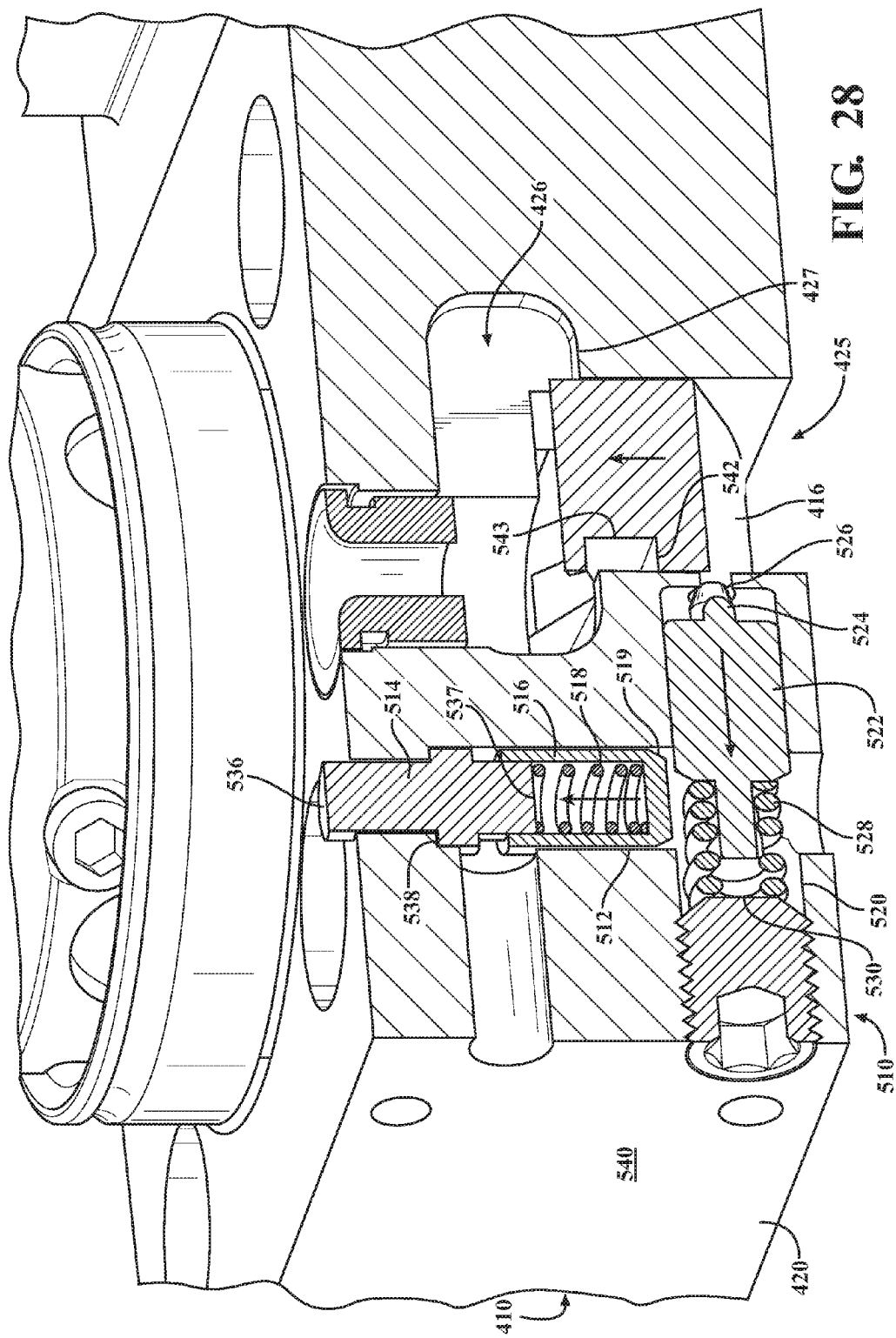
FIG. 28 is a cross-section view showing the receiver with the release lever in the lock position and the hold-open mechanism in a fourth position.

A fourth position of the hold-open mechanism 510 is seen in FIG. 28, which is a cross-section view showing the receiver 410 with the release lever 416 in the lock position and the hold-open mechanism 500 in a fourth position. In the fourth position, the coupler 480 has been removed from the receiver 410, and the sensor pin 514 has moved in response to the force applied by the first compression spring 518. As a result of this movement, the first end 536 of the sensor pin 514 is located above the upper surface 532 and the body of the sensor pin 514 is engaged with the shoulder 538 in the first bore 512.

As a result of the upward movement of the sensor pin 514, the first compression spring 518 has lengthened, which reduces the biasing force applied to the plug 516 by the first compression spring 518. The plug 516 is therefore not able to continue resisting movement of the holding pin 522 along the second bore 520 by engagement of the taper 519 of the plug 516 with the taper 523 of the holding pin 522.

In the fourth position, the holding pin 522 has retracted away from the release lever 416, such that the end portion 524 of the holding pin 522 no longer extends through the port 526 and is no longer disposed in the recess 543 of the release lever 416 for engagement with the shoulder 542. Instead, once the plug 516 no longer blocks movement of the holding pin 522, the holding pin 522 is moved by interaction of the shoulder 542 in the recess 543 of the release lever 416.

Motion of the holding pin 522 is caused by the biasing force applied to the release lever 416. In particular, the release lever 416 is biased upward by the spring force applied by the receiver housing 430, and the shoulder 542 applies an upward force to the end portion 524 of the holding pin 522. The end portion 524 has a slightly tapered or inclined surface, such that application of an upward force to the end portion 524 results in a lateral force component that is applied to the holding pin 522 in the direction of the second bore 520. Without the previously-present mechanical interference that had been applied to the holding pin 522 by the plug 516, engagement of the shoulder 542 causes the holding pin 522 to slide along the second bore 520, away from the release lever 416. Completion of this motion returns the hold-open mechanism 510 to the first position, thereby resetting the hold-open mechanism 510 so that it can be used again.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A modular tooling receiver, comprising:
    a housing including a wall having a port that extends through it;
    an engaging member that is movably disposed in the port;
    a lock actuator that is disposed on a first side of the wall, wherein the lock actuator is moveable between a first position in which the lock actuator urges the engaging member in a first direction defined from the first side of the wall to a second side of the wall and a second position wherein the lock actuator permits the engaging member to move in a second direction defined from the second side of the wall to the first side of the wall;
    a release lever that is connected to the housing and is engageable with the lock actuator for causing movement of the lock actuator from the first position toward the second position; and
    an anti-release mechanism that is connected to the release lever and is movable between an engaged position, in which the anti-release mechanism engages the housing to restrain movement of the release lever to prevent movement of the lock actuator from the first position to the second position, and a disengaged position, in which the anti-release mechanism disengages the housing to allow movement of the release lever.

2. The modular tooling receiver of claim 1, wherein the housing includes a pocket, and the anti-release mechanism engages a surface inside the pocket in the engaged position.

3. The modular tooling receiver of claim 2, wherein the housing includes a slot that is adjacent to the pocket, wherein the release lever is disposed in the slot.

4. The modular tooling receiver of claim 3, wherein the pocket is wider than the anti-release mechanism and the anti-release mechanism is wider than the slot.

5. The modular tooling receiver of claim 1, wherein the anti-release mechanism is slidably connected to the release lever.

6. The modular tooling receiver of claim 1, further comprising: a first biasing element biases the lock actuator toward the first position; a retainer that is positioned on the second side of the wall and is moveable between a first position in which the retainer is in engagement with the engaging member to obstruct movement of the engaging member in the first direction and a second position in which the retainer permits movement of the engaging member in the first direction; and a second biasing element that biases the retainer toward the first position of the retainer, wherein the wall is cylindrical, wherein the retainer is a ring, wherein the lock actuator is a piston, and wherein the engaging member is spherical.

7. The modular tooling receiver of claim 1, further comprising:
    a damper that controls a rate of motion of the lock actuator from the second position toward the first position, wherein the damper is an o-ring.

8. The modular tooling receiver of claim 1, wherein the engaging members are operable to retain engagement with a coupler in the first position and release the coupler in the second position.

9. A modular tooling assembly, comprising:
    a coupler; and
    a receiver that includes:
        a housing including a wall having a port that extends through it,
        an engaging member that is movably disposed in the port for engagement with the coupler,
        a lock actuator that is disposed on a first side of the wall, wherein the lock actuator is moveable between a first position in which the lock actuator urges the engaging member toward the coupler in a first direction defined from the first side of the wall to a second side of the wall and a second position wherein the lock actuator permits the engaging member to move away from the coupler in a second direction defined from the second side of the wall to the first side of the wall,
        a release lever that is connected to the housing and is engageable with the lock actuator for causing movement of the lock actuator from the first position toward the second position by movement of the release lever from a lock position to a release position, and
        a hold-open mechanism that is operable to retain the release lever in the release position while the coupler is in engagement with the housing and to allow the release lever to return the lock position when the coupler is no longer in engagement with the housing.

10. The modular tooling assembly of claim 9, wherein the release lever includes a recess, and the hold-open mechanism includes a holding pin that engages the recess to retain the release lever in the release position.

11. The modular tooling assembly of claim 10, wherein the hold-open mechanism includes a sensor pin that is engageable with the coupler.

12. The modular tooling assembly of claim 11, wherein the hold-open mechanism prevents retraction of the holding pin from the recess of the release lever while the sensor pin is in engagement with the coupler, and permits retraction of the holding pin from the recess of the release lever when the sensor pin is no longer in engagement with the coupler.

13. The modular tooling assembly of claim 12, wherein the holding pin is biased toward the release lever such that it moves toward the release lever and into the recess when the release lever moves from the lock position to the release position.

14. The modular tooling assembly of claim 9, the receiver further comprising: a first biasing element biases the lock actuator toward the first position; a retainer that is positioned on the second side of the wall and is moveable between a first position in which the retainer is in engagement with the engaging member to obstruct movement of the engaging member in the first direction and a second position in which the retainer permits movement of the engaging member in the first direction; and a second biasing element that biases the retainer toward the first position of the retainer, wherein the wall is cylindrical, wherein the retainer is a ring, wherein the lock actuator is a piston, and wherein the engaging member is spherical.

15. The modular tooling assembly of claim 9, further comprising:
    a damper that controls a rate of motion of the lock actuator from the second position toward the first position, wherein the damper is an o-ring.

16. The modular tooling assembly of claim 9, wherein the engaging members are operable to retain engagement with the coupler in the first position and release the coupler in the second position.

17. A modular tooling assembly, comprising:
a receiver that includes:
- a housing including a wall having a port that extends through it,
- an engaging member that is movably disposed in the port,
- a lock actuator that is disposed on a first side of the wall, wherein the lock actuator is moveable between a first position in which the lock actuator urges the engaging member in a first direction defined from the first side of the wall to a second side of the wall and a second position wherein the lock actuator permits the engaging member to move in a second direction defined from the second side of the wall to the first side of the wall,
- a release lever that is connected to the housing and is engageable with the lock actuator for causing movement of the lock actuator from the first position toward the second position, and
- a first support part; and a coupler that includes a second support part, wherein the first support part and the second support part are configured to allow the coupler to hang from the receiver while the coupler is moved from a disconnected position relative to the receiver to a connected position relative to the receiver.

18. The modular tooling assembly of claim 17, the receiver further comprising: a first biasing element biases the lock actuator toward the first position; a retainer that is positioned on the second side of the wall and is moveable between a first position in which the retainer is in engagement with the engaging member to obstruct movement of the engaging member in the first direction and a second position in which the retainer permits movement of the engaging member in the first direction; and a second biasing element that biases the retainer toward the first position of the retainer, wherein the wall is cylindrical, wherein the retainer is a ring, wherein the lock actuator is a piston, and wherein the engaging member is spherical.

19. The modular tooling assembly of claim 17, further comprising:
- a damper that controls a rate of motion of the lock actuator from the second position toward the first position, wherein the damper is an o-ring.

20. The modular tooling assembly of claim 17, wherein the engaging members are operable to retain engagement with the coupler in the first position and release the coupler in the second position.

* * * * *